US009846588B2

(12) United States Patent
Ghosh et al.

(10) Patent No.: US 9,846,588 B2
(45) Date of Patent: *Dec. 19, 2017

(54) ON-DEMAND DISPOSABLE VIRTUAL WORK SYSTEM

(71) Applicant: George Mason Research Foundation, Inc., Fairfax, VA (US)

(72) Inventors: Anup K. Ghosh, Centreville, VA (US); Sushil Jajodia, Oakton, VA (US); Yih Huang, Fairfax, VA (US); Jiang Wang, Fairfax, VA (US)

(73) Assignee: George Mason Research Foundation, Inc., Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/482,786

(22) Filed: Sep. 10, 2014

(65) Prior Publication Data

US 2015/0212842 A1 Jul. 30, 2015

Related U.S. Application Data

(63) Continuation of application No. 12/037,412, filed on Feb. 26, 2008, now Pat. No. 8,856,782.

(Continued)

(51) Int. Cl.
*G06F 9/455* (2006.01)
*G06F 21/53* (2013.01)

(52) U.S. Cl.
CPC ...... *G06F 9/45533* (2013.01); *G06F 9/45558* (2013.01); *G06F 21/53* (2013.01);
(Continued)

(58) Field of Classification Search
None
See application file for complete search history.

(56) References Cited

U.S. PATENT DOCUMENTS 5,297,269 A  3/1994 Donaldson et al.
5,394,555 A  2/1995 Hunter et al.
(Continued)

FOREIGN PATENT DOCUMENTS

WO  WO 02/21274   3/2002
WO  WO 03/067435  8/2003
(Continued)

OTHER PUBLICATIONS

Peterson et al. A Flexible Mechanism for Executing Untrusted Code. [online] (2002). University of California., pp. 207-225. Retrieved From the Internet <http://mse.uk.distfiles.macports.org/sites/ftp.wiretapped.net/pub/security/development/secure-programming/peterson-et-al-2002-a-flexible-containment-mechanism-for-executing-untrusted>.*

(Continued)

*Primary Examiner* — Emerson Puente
*Assistant Examiner* — Jonathan R Labud

(57) ABSTRACT

An on-demand disposable virtual work system that includes: a virtual machine monitor to host virtual machines, a virtual machine pool manager, a host operating system, a host program permissions list, and a request handler module. The virtual machine pool manager manages virtual machine resources. The host operating system interfaces with a user and virtual machines created with an image of a reference operating system. The host program permissions list may be a black list and/or a white list used to indicate allowable programs. The request handler module allows execution of the program if the program is allowable. If the program is not allowable, the host request handler module: denies program execution and urges a virtual machine specified by the virtual machine pool manager to execute the program. The virtual machine is terminated when the program closes.

20 Claims, 13 Drawing Sheets

Related U.S. Application Data

(60) Provisional application No. 60/892,318, filed on Mar. 1, 2007.

(52) U.S. Cl.
CPC .............. *G06F 2009/45562* (2013.01); *G06F 2009/45575* (2013.01)

(56) References Cited

U.S. PATENT DOCUMENTS

| | | |
|---|---|---|
| 5,696,822 A | 12/1997 | Nachenberg |
| 5,842,002 A | 11/1998 | Schnurer et al. |
| 5,854,916 A | 12/1998 | Nachenberg |
| 5,895,467 A | 4/1999 | Ubell et al. |
| 5,974,549 A * | 10/1999 | Golan .................... G06F 9/468 714/47.3 |
| 6,067,410 A | 5/2000 | Nachenberg |
| 6,157,721 A | 12/2000 | Shear et al. |
| 6,211,871 B1 | 4/2001 | Himmel et al. |
| 6,377,959 B1 | 4/2002 | Carlson |
| 6,496,847 B1 | 12/2002 | Bugnion et al. |
| 6,584,495 B1 | 6/2003 | Bisset et al. |
| 6,718,482 B2 | 4/2004 | Sato et al. |
| 6,832,120 B1 * | 12/2004 | Frank .................... G05B 15/02 700/17 |
| 6,845,464 B2 | 1/2005 | Gold |
| 6,859,889 B2 | 2/2005 | Matsuura et al. |
| 6,880,110 B2 | 4/2005 | Largman et al. |
| 6,883,098 B1 | 4/2005 | Roman et al. |
| 6,944,785 B2 | 9/2005 | Gadir et al. |
| 7,058,822 B2 | 6/2006 | Edery et al. |
| 7,086,090 B1 | 8/2006 | Dawson, Jr. et al. |
| 7,096,381 B2 | 8/2006 | Largman et al. |
| 7,100,075 B2 | 8/2006 | Largman et al. |
| 7,111,201 B2 | 9/2006 | Largman et al. |
| 7,137,034 B2 | 11/2006 | Largman et al. |
| 7,363,264 B1 | 4/2008 | Doughty et al. |
| 7,392,541 B2 | 6/2008 | Largman et al. |
| 7,536,598 B2 | 5/2009 | Largman et al. |
| 7,552,479 B1 | 6/2009 | Conover et al. |
| 7,571,353 B2 | 8/2009 | Largman et al. |
| 7,577,871 B2 | 8/2009 | Largman et al. |
| 7,584,503 B1 | 9/2009 | Palmer et al. |
| 7,633,864 B2 | 12/2009 | Johnson et al. |
| 7,693,991 B2 | 4/2010 | Greenlee et al. |
| 7,788,699 B2 | 8/2010 | Largman et al. |
| 7,836,303 B2 | 11/2010 | Levy et al. |
| 7,840,801 B2 | 11/2010 | Berger et al. |
| 7,849,360 B2 | 12/2010 | Largman et al. |
| 7,899,867 B1 | 3/2011 | Sherstinsky et al. |
| 7,904,797 B2 | 3/2011 | Wong |
| 7,979,889 B2 | 7/2011 | Gladstone et al. |
| 8,001,606 B1 | 8/2011 | Spertus |
| 8,078,740 B2 | 12/2011 | Franco et al. |
| 8,196,205 B2 | 6/2012 | Gribble et al. |
| 8,290,763 B1 | 10/2012 | Zhang |
| 8,356,352 B1 | 1/2013 | Wawda et al. |
| 8,370,931 B1 | 2/2013 | Chien et al. |
| 8,401,982 B1 | 3/2013 | Satish et al. |
| 8,447,880 B2 | 5/2013 | Johnson et al. |
| 8,468,600 B1 | 6/2013 | Kaskel et al. |
| 8,479,286 B2 | 7/2013 | Dalcher et al. |
| 8,572,735 B2 | 10/2013 | Ghosh et al. |
| 8,578,345 B1 | 11/2013 | Kennedy et al. |
| 8,719,924 B1 | 5/2014 | Williamson et al. |
| 8,775,369 B2 | 7/2014 | Largman et al. |
| 8,793,787 B2 | 7/2014 | Ismael et al. |
| 8,839,422 B2 | 9/2014 | Ghosh et al. |
| 8,856,782 B2 | 10/2014 | Ghosh et al. |
| 8,881,284 B1 | 11/2014 | Gabriel |
| 9,081,959 B2 | 7/2015 | Ghosh et al. |
| 9,111,089 B1 | 8/2015 | Bhatia et al. |
| 2002/0004799 A1 | 1/2002 | Gorelik et al. |
| 2002/0013802 A1 | 1/2002 | Mori et al. |
| 2002/0138701 A1 * | 9/2002 | Suzuoki ................ H04L 69/12 711/154 |
| 2003/0023895 A1 | 1/2003 | Sinha et al. |
| 2004/0008652 A1 | 1/2004 | Tanzella et al. |
| 2004/0025158 A1 | 2/2004 | Traut |
| 2004/0064735 A1 | 4/2004 | Frazier et al. |
| 2004/0093372 A1 | 5/2004 | Chen et al. |
| 2005/0160133 A1 | 7/2005 | Greenlee et al. |
| 2006/0021029 A1 * | 1/2006 | Brickell ................ G06F 21/51 726/22 |
| 2006/0136720 A1 | 6/2006 | Armstrong et al. |
| 2006/0168156 A1 | 7/2006 | Bae et al. |
| 2006/0206904 A1 | 9/2006 | Watkins et al. |
| 2006/0271661 A1 | 11/2006 | Qi et al. |
| 2006/0277433 A1 | 12/2006 | Largman et al. |
| 2006/0294519 A1 | 12/2006 | Hattori et al. |
| 2007/0044151 A1 | 2/2007 | Whitmore |
| 2007/0079307 A1 | 4/2007 | Dhawan et al. |
| 2007/0106993 A1 | 5/2007 | Largman et al. |
| 2007/0107058 A1 | 5/2007 | Schuba et al. |
| 2007/0174915 A1 | 7/2007 | Gribble et al. |
| 2007/0192866 A1 | 8/2007 | Sagoo et al. |
| 2007/0240212 A1 | 10/2007 | Matalytski |
| 2007/0250833 A1 | 10/2007 | Araujo, Jr. et al. |
| 2007/0271610 A1 | 11/2007 | Grobman |
| 2007/0289019 A1 | 12/2007 | Lowrey |
| 2008/0016339 A1 | 1/2008 | Shukla |
| 2008/0059556 A1 | 3/2008 | Greenspan et al. |
| 2008/0082976 A1 | 4/2008 | Steinwagner et al. |
| 2008/0098465 A1 | 4/2008 | Ramakrishna |
| 2008/0127348 A1 | 5/2008 | Largman et al. |
| 2008/0141266 A1 | 6/2008 | Hunt et al. |
| 2008/0175246 A1 | 7/2008 | Kunhappan et al. |
| 2008/0215852 A1 | 9/2008 | Largman et al. |
| 2008/0235764 A1 | 9/2008 | Cohen et al. |
| 2008/0244743 A1 | 10/2008 | Largman et al. |
| 2008/0244747 A1 | 10/2008 | Gleichauf et al. |
| 2008/0271019 A1 | 10/2008 | Stratton et al. |
| 2008/0271025 A1 | 10/2008 | Gross et al. |
| 2008/0320594 A1 | 12/2008 | Jiang |
| 2009/0025009 A1 | 1/2009 | Brunswig et al. |
| 2009/0044265 A1 | 2/2009 | Ghosh et al. |
| 2009/0125902 A1 * | 5/2009 | Ghosh .................. G06F 9/45533 718/1 |
| 2009/0158432 A1 | 6/2009 | Zheng et al. |
| 2009/0172662 A1 | 7/2009 | Liu |
| 2009/0300599 A1 | 12/2009 | Piotrowski |
| 2009/0300739 A1 | 12/2009 | Nice et al. |
| 2009/0328008 A1 | 12/2009 | Mital et al. |
| 2010/0005531 A1 | 1/2010 | Largman et al. |
| 2010/0037235 A1 | 2/2010 | Larimore et al. |
| 2010/0064039 A9 | 3/2010 | Ginter et al. |
| 2010/0115621 A1 | 5/2010 | Staniford et al. |
| 2010/0122342 A1 | 5/2010 | El-Moussa et al. |
| 2010/0122343 A1 | 5/2010 | Ghosh et al. |
| 2010/0125903 A1 | 5/2010 | Devarajan et al. |
| 2010/0138639 A1 | 6/2010 | Shah et al. |
| 2010/0146523 A1 | 6/2010 | Brigaut et al. |
| 2010/0192011 A1 | 7/2010 | Largman et al. |
| 2010/0223613 A1 | 9/2010 | Schneider |
| 2010/0235830 A1 | 9/2010 | Shukla et al. |
| 2011/0047620 A1 | 2/2011 | Mahaffey et al. |
| 2011/0083180 A1 | 4/2011 | Mashevsky et al. |
| 2011/0099620 A1 | 4/2011 | Stavrou et al. |
| 2011/0145923 A1 | 6/2011 | Largman et al. |
| 2011/0191851 A1 | 8/2011 | Largman et al. |
| 2012/0297457 A1 | 11/2012 | Schulte et al. |
| 2012/0317645 A1 | 12/2012 | Fortier |
| 2013/0145463 A1 | 6/2013 | Ghosh et al. |
| 2015/0324586 A1 | 11/2015 | Ghosh et al. |

FOREIGN PATENT DOCUMENTS

| | | |
|---|---|---|
| WO | WO 2005/074433 | 8/2005 |
| WO | WO 2005/074434 | 8/2005 |
| WO | WO 2005/116804 | 12/2005 |
| WO | WO 2007/048062 | 4/2007 |

(56) References Cited

FOREIGN PATENT DOCUMENTS

| WO | WO 2008/027563 | 3/2008 |
|---|---|---|
| WO | WO 2008/027564 | 3/2008 |
| WO | WO 2008/092031 | 7/2008 |

OTHER PUBLICATIONS

Office Action for U.S. Appl. No. 13/690,452, dated Nov. 8, 2013.
Office Action for U.S. Appl. No. 13/690,452, dated Jun. 12, 2014.
Office Action for U.S. Appl. No. 13/690,452, dated Jan. 30, 2015, 21 pages.
International Search Report and Written Opinion dated Mar. 12, 2013 for International Application No. PCT/US2012/067311.
Office Action for U.S. Appl. No. 12/558,841, dated Apr. 3, 2012.
Office Action for U.S. Appl. No. 12/558,841, dated Jan. 30, 2013.
Office Action for U.S. Appl. No. 12/558,841, dated Jan. 9, 2014.
Office Action for U.S. Appl. No. 12/558,841, dated Sep. 30, 2014.
Office Action for U.S. Appl. No. 12/037,412, dated Aug. 16, 2013.
Final Office Action for U.S. Appl. No. 12/037,412, dated Apr. 23, 2012.
Office Action for U.S. Appl. No. 12/037,412, dated Oct. 27, 2011.
Office Action for U.S. Appl. No. 12/059,454, dated Feb. 2, 2011.
Final Office Action for U.S. Appl. No. 12/059,454, dated Oct. 12, 2011.
Office Action for U.S. Appl. No. 12/757,675, dated May 15, 2013.
Office Action for U.S. Appl. No. 12/757,675, dated Aug. 2, 2012.
Office Action for U.S. Appl. No. 12/827,203, dated Jan. 15, 2013.
Office Action for U.S. Appl. No. 12/827,203, dated Apr. 17, 2014.
Adabala et al, From virtualized resources to vritual computing grids: the In-VIGO system. [online] (Nov. 11, 2003), Elsevier, pp. 1-14. Retrieved from the Internet: <http://users.cis.fiu.edu/-zhaom/research/fgcs.pdf>.
Huang, Y. et al., Efficiently tracking application interactions using lightweight virtualization, ACM, Oct. 31, 2008, 9 pages.
Peterson et al., "A Flexible Containment Mechanism for Executing Untrusted Code," [online] (2002). University of California, pp. 207-225. Retrieved from the Internet: <http://mse.uk.disfiles.macports.org/sites/ftp.wiretapped.net/pub/security/development/secure-programming/peterson-et-al-2002-a-flexible-containment-mechanism-for-executing-untrusted>.
Royal et al., "PolyUnpack: Automating the Hidden-Code Extraction of Unpack-Executing Malware". Computer Security Application Conference, 2006. ACSAC '06. 22nd Annual [online], Dec. 2006 [retrieved Apr. 4, 2014], Retrieved from the internet:<URL: http://ieeexplore.ieee.org/stamp/stamp.jsp?tp=&arnumber=4041175>.
Sapuntzakis, C. et al., "Virtual Appliances for Deploying and Maintaining Software," [online] (2003), ACM, Retrieved from the Internet <URL: http://dl.acm.org/citation.cfm?id=1051965>, 15 pages.
Ugurlu, "Stealth Sandbox Analysis of Malware," PhD Thesis, Bilkent University (Ankara, Turkey) [online], Published Aug. 2009 [retrieved on Feb. 7, 2013] Retrieved from the Internet <URL:http://www.thesis.bilkent.edu.tr/0003921.pdf>.
Office Action for U.S. Appl. No. 14/797,847, dated Nov. 23, 2015, 22 pages.
Office Action for U.S. Appl. No. 14/808,681, dated Jun. 15, 2016.
Notice of Allowance for U.S. Appl. No. 14/480,657, dated Apr. 25, 2016.
Final Office Action for U.S. Appl. No. 14/797,847, dated May 17, 2016.
Wang, et al., Web Canary: A Virtualized Web Browser to Support Large-Scale Silent Collaboration in Detecting Malicious Web Sites (Web Canary), Nov. 15, 2008.
Jiang Wang, et al., "SafeFox: a Safe Lightweight Virtual Browsing Environment", Proceedings of the 43$^{rd}$ Hawaii International Conference on System Sciences, 2010.
Capture Communication Protocol, Sep. 22, 2007, Victoria University of Wellington, New Zealand.
Seifert, et al., Capture-HPC, About Capture Honeypot/Honeyclient, Sep. 22, 2008, Victoria University of Wellington, New Zealand.
Capture-HPC Client Honcypot/Honeyclient, Sep. 2, 2008, Victoria University of Wellington, New Zealand.
Know you Enemy: Malicious Web Servers, Aug. 9, 2007, http://www.honeypot.org.
Tzi-cker Chiueh et al., Spout: a transparent distributed execution engine for Java applets, Computer Science Department, State University of New York at Stony Brook, http://www.ecsl.cs.sunyb.edu/spout.html, Apr. 2000.
Sushil Jajodia, et al., Application-Level Isolation to Cope With Malicious Database Users, The Mitre Corporation, Center for Secure Information Systems, and Department of Information and Software Engineering George Mason University, Dec. 1998.
Peng Liu, et al., Intrusion Confinement by Isolation in Information Systems, Department of Information Systems, University of Maryland, Baltimore County, The MITRE Corporation, Center for Secure Information Systems, and Department of Information and Software Engineering George Mason University, vol. 43, The International Federation for Information Processing (IFIP), pp. 3-18, Jul. 25-28, 1999.
Dahlia Malkhi, et al., Secure Execution of Java Applets using a Remote Playground, AT&T Labs Research, IEEE Transactions on Software Engineering, vol. 26, Issue 12, Dec. 2000, pp. 1197-1209.
R. Sekar, et al., A Specification-Based Approach for Building Survivable Systems, 21$^{st}$ National Information Systems Security Conference, Oct. 1998.
Software for the Secure Management and deployment of Java, Digitivity, Inc., Aug. 6, 1998, http://www.digitivity.com/html/body_products.html.
Tarek Dehni, et al., Intelligent Networks and the HP OpenCall Technology, Aug. 1997, Article 6, Hewlett-Packard Journal, pp. 1-14.
Thomas C. Bressoud, TFT: A Software System for Application-Transparent Fault Tolerance, Twenty-Eight Annual International Symposium on Fault-Tolerant Computing, 1998.
Arbaugh, et al., Automated Recovery in a Secure Bootstrap Process, University of Pennsylvania, Distributed Systems Laboratory, Aug. 1, 1997.
Thomas C. Bressoud, et al., Hypervisor-Based Fault-Tolerance, ACM Transactions on Computer Systems, vol. 14, No. 1, Feb. 1996, pp. 80-107.
Jonback, et al., Open architecture in the Core of AXE, Ericsson Review No. 1, 2001.
Solstice DiskSuite 4.2.1 Reference Guide, Sun Microsystems, Inc., Feb. 2000.
Jieh-Sheng Lee et al., A Generic Virus Detection Agent on the Internet, Proceedings of The Thirtieth Annual Hawaii International Conference on System Sciences 1997.
Grzegorz Czajkowski, Application Isolation in the Java Virtual Machine, Sun Microsystems Laboratories, Proceedings of the 15th ACM SIGPLAN conference on Object-oriented programming, systems, languages, and applications vol. 35, Issue 10, Oct. 2000, pp. 354-366.
Lenny Zeltser, Reverse Engineering Malware, May 2001.
The Symantec Enterprise Papers, Understanding and Managing Polymorphic Viruses, vol. XXX, copyright 1996.
Jeremy Sugerman, et al., Virtualizing I/O Devices on VMware Workstation's Hosted Virtual Machine Monitor, Proceedings of the 2001 USENIX Annual Technical Conference, Jun. 2001.
Constantine Sapuntzakis, et al., "Virtual Appliances for Deploying and Maintaining Software", Computer Systems Laboratory, Stanford University, Oct. 2003.
JMunro, Virtual Machines & VMware, Part 1, Dec. 21, 2001, http://www.extremetech.com/computing/72186-virtual-machines-vmware-part-i.
JMunro, Virtual Machines & VMware, Part II, Dec. 28, 2001, http://www.extremetech.com/computing/72268-virtual-machines-vmware-part-ii.
J. Steven Fritzinger, et al., Java Security, Sun Microsystems, Inc. 1996.
U.S. Provisional U.S. Appl. No. 61/221,749, filed Jun. 30, 2009.
http://collaboratecom.org/2008/program.php—Orlando, FL, Nov. 2008.

(56) References Cited

OTHER PUBLICATIONS

CollaborateComm 2008 Selected Publications Table of Contents, Nov. 2008.
CollaborateComin 2008 Registration Policy, Orlando, FL, Nov. 13-16, 2008, 3 pages.
Timeline-Capture HPC, Nov. 13, 2008, 2 pages https://projects.honeynet.org/capture-hpc/timeline?from=20081113T21%3A15%3A49Z&precision=second.
Timeline Capture HPC, Apr. 15, 2008, 4 pages https://projects.honeynet.org/capturehpc/timeline?from=20080415T13%3A53%3A08Z&precision=second.
WikiStart (history) Capture-HPC, https://projects.honeynet.org/capture-hpc/wiki/WikiStart?action=history , Nov. 20, 2015.
https://www.microsoft.com/resources/documentation/windows/xp/all/proddocs/enus/shutdown.mspx?mfr—true, Microsoft Windows XP—Shutdown, Feb. 23, 2016.
Vir2us, Inc. v. Invincea, Inc. and Invincea Labs, LLC—Civil Action No. 2:15-cv-00162HCM-LRL—Vir2us" Opening Claim Construction Brief—Document 48, Dec. 23, 2015, 31 pages.
Vir2us, Inc. v. Invincea, Inc. and Invincea Labs, LLC—Civil Action No. 2:15-cv-00162HCM-LRL—Krein Decl In Support—Document 50, Dec. 23, 2015, 18 pages.
Vir2us, Inc. v. Invincea, Inc. and Invincea Labs, LLC—Civil Action No. 2:15-cv-00162HCM-LRL—Invincea's Opening Claim Construction Brief—Document 51, Dec. 23, 2015, 31 pages.
Vir2us, Inc. v. Invincea, Inc. and Invincea Labs, LLC—Civil Action No. 2:15-cv-00162HCM-LRL—Decl of Rubin in Support of Invincea's Opening Claim Construction Brief—Document 52, Dec. 23, 2015, 34 pages.
Vir2us, Inc. v. Invincea, Inc. and Invincea Labs, LLC—Civil Action No. 2:15-cv-00162HCM-LRL—Invincea's Responsive Claim Construction Brief—Document 57, Jan. 11, 2016, 31 pages.
Vir2us, Inc. v. Invincea, Inc. and Invincea Labs, LLC—Civil Action No. 2:15-cv-00162HCM-LRL—Supp Decl of Rubin in Support of Invincea's Responsive Claim Construction Brief Document 57-1, Jan. 11, 2016, 13 pages.
Vir2us, Inc. v. Invincea, Inc. and Invincea Labs, LLC—Civil Action No, 2:15-cv-00162HCM-LRL—Vir2us" Responsive Claim Construction Brief—Document 58, Jan. 11, 2016, 31 pages.
Vir2us, Inc. v. Invincea, Inc. and Invincea Labs, LLC—Civil Action No. 2:15-cv-00162HCM-LRL—Rebuttal Declaration of Krein in Support of Vir2us" Responsive Claim Construction Brief-Document 59, Jan. 11, 2016, 18 pages.
Vir2us, Inc. v. Invincea, Inc. and Invincea Labs, LLC—Civil Action No. 2:15-cv-00162HCM-LRL—Exhibit 2—Joint Claim Construction and Prehearing Statement, Document 61-2, Jan. 18, 2016, 4 pages.
Vir2us, Inc. v. Invincea, Inc. and Invincea Labs, LLC—Civil Action No. 2:15-cv-00162HCM-LRL—Exhibit 3—Joint Claim Construction and Prehearing Statement—Document 61-3, Jan. 18, 2016, 9 pages.
Vir2us, Inc. v. Invincea, Inc. and Invincea Labs, LLC—Civil Action No. 2:15-cv-00162HCM-LRL—Claim Construction Memorandum and Order, Document 69, Feb. 5, 2016, 16 pages.
Vir2us, Inc. v. Invincea, Inc. and Invincea Labs, LLC—Civil Action No. 2:15-cv-00162HCM-LRL—Vir2us Preliminary Invalidity Contentions, Exhibits, and Supporting Documents, Nov. 23, 2015.
Morales et al., "Building malware infection trees," Malicious and unwanted Software (Malware), Oct. 2011, 6th International Conference on (pp. 50-57), IEEE 2011.
A. Moshchuk, et al., "SpyProxy: Execution-based Detection of Malicious Web Content," Proceedings of 16th USENIX Security Symposium on Usenix Security Symposium, Aug. 6-10, 2007.
Matt Hines, "'Virtual sandboxing' provides safe security testing," Computerworld, Aug. 9, 2007.

\* cited by examiner

ON-DEMAND DISPOSABLE VIRTUAL WORK SYSTEM

CROSS-REFERENCE TO RELATED APPLICATIONS

This application is a continuation of U.S. patent application Ser. No. 12/037,412, filed Feb. 26, 2008 and entitled "On-Demand Disposable Virtual Work System," now U.S. Pat. No. 8,856,782, which claims priority to and the benefit of U.S. Provisional Patent Application No. 60/892,318, filed Mar. 1, 2007, and entitled "On-Demand Disposable Virtual Work System," each of which is incorporated herein by reference in its entirety.

DETAILED DESCRIPTION OF EMBODIMENTS

Figure 1:
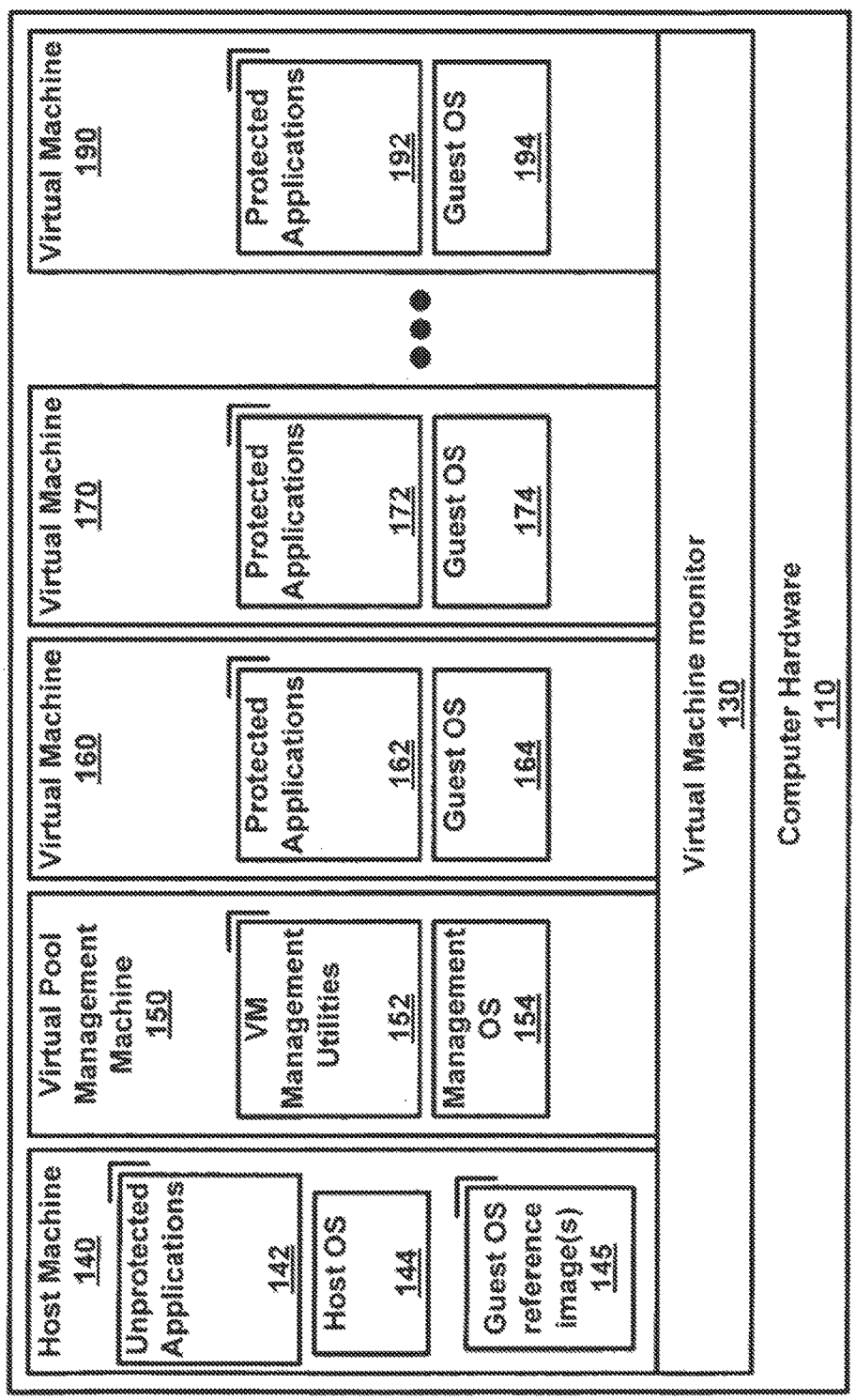
FIG. 1 is a block diagram of the architecture of an aspect of an embodiment of the present invention.

Embodiments of the present invention are designed to effectively eliminate most Internet-enabled compromises of computer system security. The system and approach present a radical departure from current information security tools and practices and current computing practices. Where today's information security tools and practices focus either on building better software or filtering mechanisms such as firewalls to prevent remote exploitation or building tools to detect compromises, the invention described here provides a safe environment for running Internet-connected software and obviates the need for perfect software. The system provides an environment in which intrusions or compromises present a limited threat to the host system or other software and user data.

The embodiments work by launching a virtual machine for each Internet-enabled or untrusted application that is started. The virtual machine provides a pristine guest operating system (OS) for the Internet-enabled or untrusted application that is launched. This operating system may be an operating system unmodified from the original version delivered by the manufacturer or other version suitably configured for the task of running intended applications. The virtual machine and its guest operating system may be temporally limited to exist only for the duration of the session of the application. When the user exits the application, the virtual machine can be destroyed. For the duration of the session, the virtual machine provides an isolated environment from the host machine from which it is launched. The virtual machine provides a level of isolation from the host machine that is the equivalent to running a physically separate machine from the host machine. The virtual machine is essentially a sacrificial machine that lives only for the duration of the application session. Any attacks that occur on the machine via an Internet connection can compromise only the virtual machine that is started up for that session. When the session is terminated, so is the virtual machine and the compromise. With each new session, a pristine new virtual machine is started up, meaning that any malicious software that was downloaded or planted during a prior session is no longer present. The underlying host operating system does not need to maintain an Internet connection. As a result, Internet-based attacks have a very limited ability to compromise the host operating system.

Embodiments of the invention can also implement persistent storage mechanisms for the cases that data either needs to survive the destruction of a temporary virtual machine or needs to be communicated to an entity external to the temporary virtual machine. Access to persistent storage may be made using an authentication procedure to prove to the system that the access is approved by a user and not a malicious program. Alternatively, access to persistent storage can be made by creating a shared directory to the host operating system, but restricting guest operating system access only to the shared directory on the host operating system. For high assurance, the authentication mechanism may be as simple as a mouse click in response to a dialog box, or as complex as a detailed Turing test.

Using the presently described technology, users may no longer have to worry about securing their systems with additional tools (such as firewalls, personal firewalls, spyware detectors, rootkit detectors, and intrusion detection systems), or even patching their systems with the latest daily or weekly patch from the software manufacturers to patch the latest bug in their software system. However, it should be noted that this system is not incompatible with these tools and can use these tools to provide health status information on the virtual machines created for an application session. This represents a radical departure from current arms race between computer system attackers and defenders. In addition, it presents a new computing paradigm for desktop operating systems. Currently, Internet-enabled applications run side-by-side with all other desktop and system software with the privileges of the user. As a result, when a compromise occurs through the Internet, the entire system can be compromised by a single vulnerability in an Internet-enabled software such as a Web browser or an email client. By simply browsing to a Web page, a user can compromise their system. By downloading music or music players, a user can compromise their system, sometimes irreversibly.

Using embodiments of the present invention, Internet-enabled applications can each run on their own instance of a guest operating system with a new user's privilege isolated from the host operating system and from other applications and data. As a result, any compromises that may occur during the time window of the session is contained within the guest operating system out of reach of the host operating system and persistent data. Any software that is downloaded during that session can be run without worry of compromising the host operating system or data. This includes spyware, rootkits, and other types of malicious software. Any sort malicious mobile code that runs in the Web browser should only last only for the duration of the session. Even viruses embedded in documents should not have access to other documents, nor should they persist past the duration of the session. At the conclusion of the session, the guest operating system is killed as the virtual machine exits. All changes to the software system are only temporary as the next time an application is launched a pristine version of the guest OS is created.

Architecture

The approach to building the on-demand disposable virtual work system uses core technology building blocks in a novel computing paradigm involving dispatching temporary operating systems for each untrusted application. That is, instead of launching the application natively from the host operating system, untrusted applications may be started by first launching a guest operating system in a virtual machine that then starts the untrusted application. Untrusted applications, by default, can be any application that requires Internet access or any application that is not on an organization's approved list of trusted programs. The invention, through this method, handles the creation and management of virtual machines and the automatic redirection of applications to start in the virtual machine created for them.

FIG. 1 shows the architecture of an embodiment of the present invention. The off-the-shelf components are commodity microprocessors, operating systems, software applications and virtual machine technology. The design can use commodity personal computer 110 containing microprocessors including those based on the Intel/AMD x86 family of microprocessors and the PowerPC microprocessor. The architecture uses the notion of a host operating system 144 and guest operating systems (164, 174 and 1940) that are launched with each protected applications (162, 172 and 192). The architecture may support a variety of commodity operating systems including Windows, Linux, and Mac OS, in both the host operating system and the guest operating system. In some cases you may run a Linux operating system as a guest operating system on top of a Windows host operating system, and vice versa. The choice of operating systems to use is determined by the applications to be launched based on the operating system for which they were built. That is, Windows guest operating systems are launched when a Windows protected application is started and Linux operating systems are launched with a Linux protected application is started. Finally, the architecture may use commodity virtual machine technology such as the Xen virtual machine monitor (VMM) and VMware virtual machine monitor. Xen is a virtual machine monitor for IA-32, x86-64, IA-64 and PowerPC architectures. It is software that runs on a computer system 110 and allows one to run several guest operating systems on top of the host on the same computer hardware at the same time. Copies of Xen may obtained from www.xensource.com.

The embodiment of the architecture shown in FIG. 1 uses the standard virtual machine architecture with the Virtual Machine Monitor (VMM) 130 running on the hardware 110, and operating systems (144, 154, 164, 174, and 194) running on top of the VMM 130. A host operating system (OS) 144 is defined as the default machine the user normally uses and is the machine whose desktop is presented to the user. Guest OSs (164, 174 and 194) are created by request when a protected application (162, 172 and 192) is launched, or created in advance to enable higher performance when launching protected applications (162, 172 and 192) into pre-instantiated guest OSs (164, 174 and 194). A Management VM 150 may be bootstrapped along with the Host OS 144 and a reference guest OS 145 that is used for clones of the guest OS reference image 145. The Management VM 150 is used for command, control, and lifecycle maintenance of the guest OSs (164, 174 and 194) based on the instructions from the host OS 144. The number of guest OSs instantiated may be dependent on the number of protected applications launches and the performance limits of the underlying hardware. The VMM (130) and VM (150) should support live capture of the full system state in a file for subsequent replay. This file is called a "snapshot" of system state.

The host operating system 144 may be configured for higher security so that it is unable to make Internet connections itself. This can be enforced by a loadable kernel module, a personal firewall, disabling the network protocol stack of the host, or other means to restrict the IP address space to which network connections can be made or accepted. The loadable kernel module should guarantee that no application on the host machine 140 can communicate to the Internet. The guest operating systems (164, 174 and 194) may be free to make direct Internet connections; however, they should be restricted from freely accessing the host operating system 144 by the virtual machine monitor 130 that runs in its own hardware protection domain which provides hardware-equivalent strong isolation between the virtual machine and its host operating system. The guest operating systems (164, 174 and 194), which are pristine builds of the OS, should also be "root secure", which means that even if one of the guest operating systems (164, 174 and 194) is compromised to a root user level or the kernel itself is compromised, the host operating system 144 itself should not be compromised by the compromised guest operating system. Once a guest operating system is destroyed (upon closure of the protected application that started the guest OS), the compromise is now removed from the system.

As mentioned earlier, a reference guest OS 145 may be booted along with the host OS 144. A snapshot of the reference guest OS 145 may be taken, then used to derive subsequent VM images by cloning it, i.e., creating a replica image of the reference guest OS. When a new untrusted application is to be started, a dispatch instruction is sent from the Host OS to the Virtual Pool Management Machine 150, which then creates a VM for the application using the reference guest OS image, if the VM has not already been created. By cloning and pre-booting reference images, the response time for instantiating the application should be on par or even faster than the usual response time for starting a new application for users.

Concept of Operation

Embodiments of the present invention should be largely transparent to the user in look, feel, and operation. That is, the user need not be aware of the virtualization operation and its commensurate protections, except for authenticated reads and writes to and from persistent storage from protected applications. The system should boot as normal with the native operating system as well as loading the VMM. The guest OSs should be relatively invisible to the user, i.e., they run in the background. The user operates the computer as he or she normally would, with the exception that no Internet connections to the host operating system may be allowed. When the user launches a "protected" application, that is one defined in the IC configuration file as "protected", then instead of launching the application, the application may be dispatched to one of the guest OSs running in the background. Protected applications are nominally those defined with Internet access, but may include other applications as configured by the user to run in Guest OSs including standard desktop computing applications. Applications not configured as protected, should run natively in the host operating system (144).

When a protected application is launched, whether directly from the desktop by the user, by double-clicking on a file with an application association, or by any other application or other means, the process can be dispatched to the guest operating system, and the corresponding application launched in the guest OS. The fact that the application is running in a guest operating system should be largely transparent to the user, except for a possible windowing designation that indicates the application that in is running in the protected mode environment, i.e., the guest operating system. The guest OS may be created with application launch or may already be instantiated and destroyed when the application session is complete or when the user terminates the virtual machine.

As described earlier, FIG. 1 shows an embodiment of the present invention where virtual machines monitor 130 runs direct on computer hardware 110. In this embodiment, every machine (140, 150, 160, 170 and 190) is essentially a guest machine to the computer hardware. In this setup, the unprotected host applications 142 run on the host machine 140 natively and the host operating system 144 runs these applications 142. In contrast, the guest virtual machines 160, 170 and 190 run protected applications (162, 172, and 192 respectively) that may talk to a network under guest operating systems (164, 174 and 194 respectively).

The guest operating systems 164, 174, and 194 are each cloned from one of the guest operating system image(s) 145. The images 145 should be pristine snapshots of a running operating system. To increase speed, the snapshots may also include running applications. For example, an image 145 of an operating system for an email virtual machine can include a copy of an email application running under the operating system.

The virtual pool management machine 150 runs a series of virtual machine management utilities 152 under a management operating system 154. These utilities 152 include functions that: create, destroy, put to sleep and wake up virtual machines. The utilities also maintain a list that matches applications to virtual machines. In other embodiments, these same functions may be performed by pool management utilities running on a host machine. For example, in FIG. 2 these functions are performed by virtual machine pool manager 246.

Figure 2:
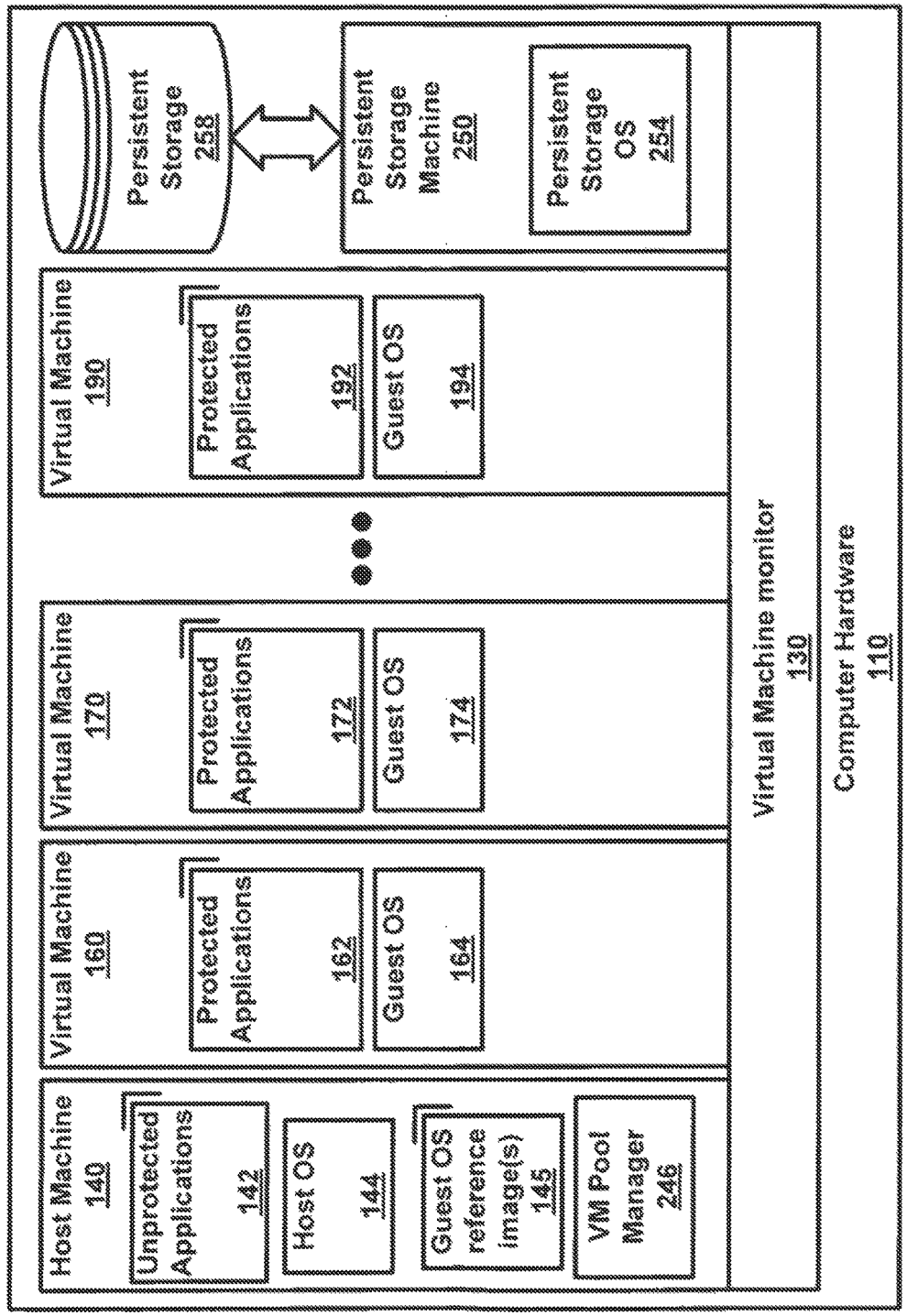
FIG. 2 is a block diagram of the architecture of an aspect of an embodiment of the present invention.

FIG. 2 shows an embodiment of the present invention demonstrating some possible variations from the embodiment of FIG. 1. As shown in this figure, the virtual pool management machine 150 in FIG. 1 has been replaced by virtual machine pool manager 246 running on the host machine 240. Virtual pool management machine 150 and virtual machine pool manager 246 may perform essentially the same functions. However, in FIG. 2, these functions reside solely on host machine 140.

As in FIG. 1, this embodiment also includes: a virtual machine monitor 130 running directly on computer hardware 110; a host operating system 144; and a series of guest virtual machines 160, 170 and 190. The host machine 140 should not be connected to any networks.

Additionally, the embodiment of FIG. 2 includes the addition of persistent storage 258. The idea behind using a persistent file storage 258 is to enable the temporary virtual machines to save any documents or data that may be needed later. The persistent file storage 258 may also be used as a mechanism for safely passing information between the temporary virtual machines. In this embodiment, the persistent storage drive 258 is accessed through a persistent storage machine 250. In this embodiment, the persistent storage machine is a virtual machine file server running a persistent storage operating machine. Commercial file server software may be used in virtual machine 250. File server software for Microsoft Windows machines may be obtained from Netpro, Inc. of Phoenix Ariz. and file server software to run under Linux may be obtained from Redhat Inc. of Raleigh N.C. This is only an example of how persistent storage may be implemented. For example, one could utilize a stand alone persistent file server or the host operating system's file system. Additionally, persistent file storage may be located anywhere in the organization on the network.

Figure 3:
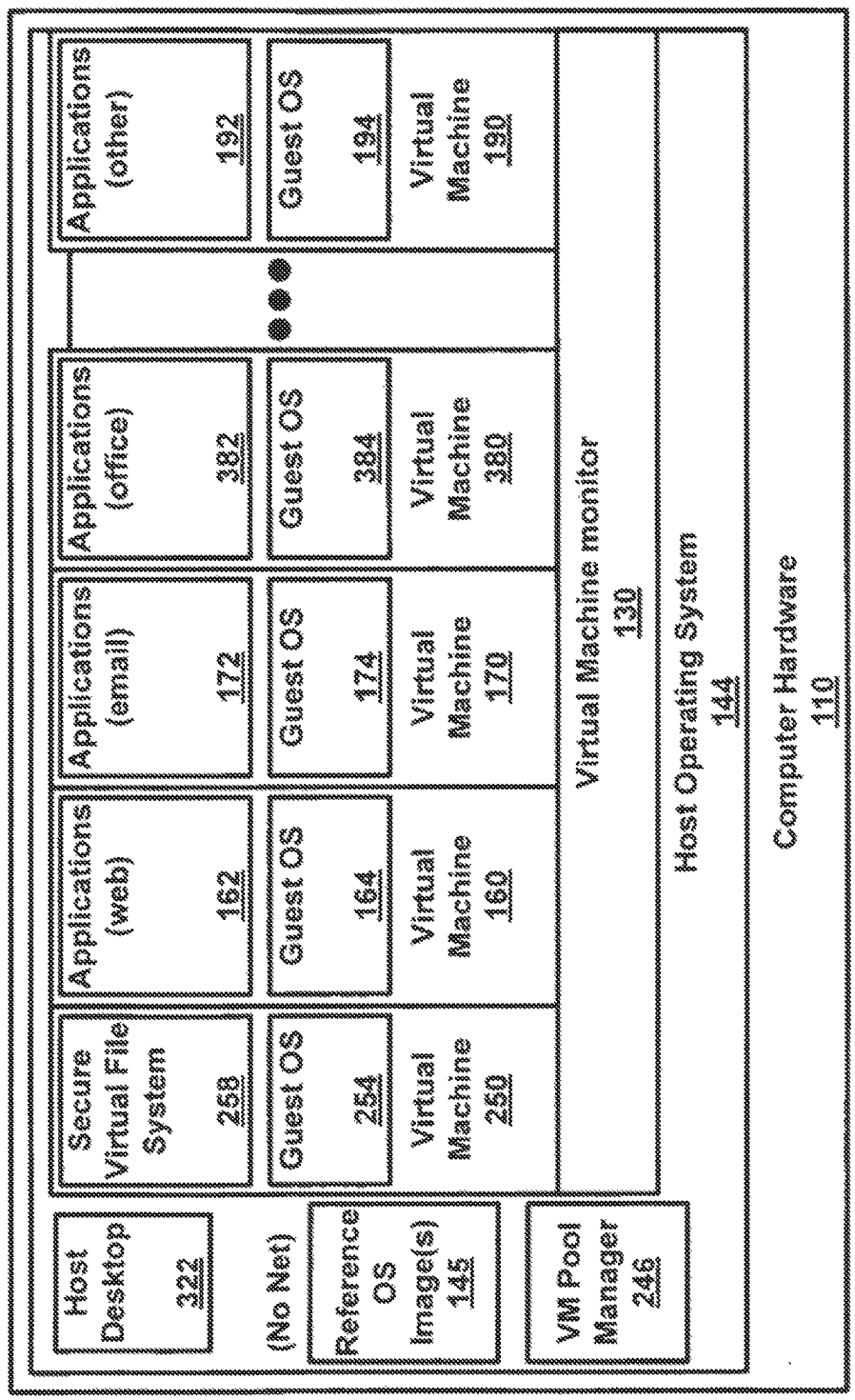
FIG. 3 is a block diagram of an aspect of an embodiment of the present invention.

FIG. 3 shows another embodiment of the present invention where the virtual machine monitor 130 is running on the host operating system 144 rather than directly on the computer hardware 110. In this embodiment, the host operating system desktop software 322 is used to interface the user with the system as normal, and a series of guest virtual machines 250, 160, 170, 380 and 190. The desktop 322 is running on the host operating system 144. The host operating system is running on the computer hardware 110 and the virtual machine monitor 130 is running on the host operating system 144. The guest virtual machines 250, 160, 170, 380 and 190 run in virtual machine environment controlled by virtual machine monitor 130.

Each of the virtual machines has their own guest OS (254, 164, 174, 384 and 194 respectively) which was cloned from one of the reference OS image(s) 145. Although reference image(s) 145 are shown residing with the host operating system 144, one skilled in the art will recognize that these image(s) 145 could be located elsewhere. For example, they could be stored directly in the computer hardware 110 memory or in an external disk drive or other type of persistent storage device accessible by the host operating system 144.

As shown, several of these guest machines are dedicated to specific applications. Machine 250 is dedicated to file storage, machine 160 is dedicated to web applications 162, virtual machine 170 is dedicated to email applications 172, virtual machine 380 is dedicated to Microsoft office applications 382, and virtual machine 190 is dedicated as a "catch-all" machine to run applications 192 not dedicated to other machines. The designation of protected applications to guest machines is configurable by users.

Recall that the host desktop 322 does not need to be connected to a network. So, if a user tries to run an application on the host desktop 322 that requires network applications, it may not be able to access the network.

The way the system works, a user interacts with the host desktop 322. The applications on the virtual machines run in the background. When a user goes to run a host allowable application (usually a non-network application), that application is brought to the forefront of the display and run on the host operating machine 144. When the user goes to run a protected application (usually a networked application), then that application should be intercepted and redirected to a virtual machine dedicated for the application. The application may then be brought to the forefront of the desktop 322 as it is run on the guest virtual machine. If there is no virtual machine dedicated for the application, then the applications may be redirected to the catch-all virtual machine 190. In some embodiments, the redirection of unspecified applications to a catch-all virtual machine 190 can be optional, directed by a set of rules, or not allowed at all. In some embodiments, the option to auto-restore the guest virtual machines on a count-down timer is provided. After a user-specified countdown timer times out, the Internet Cleanroom software will automatically restore the guest machine back to its pristine state to ensure periodic cleansing of the machines to their initial pristine state. These options can provide differing levels of security.

Figure 4:
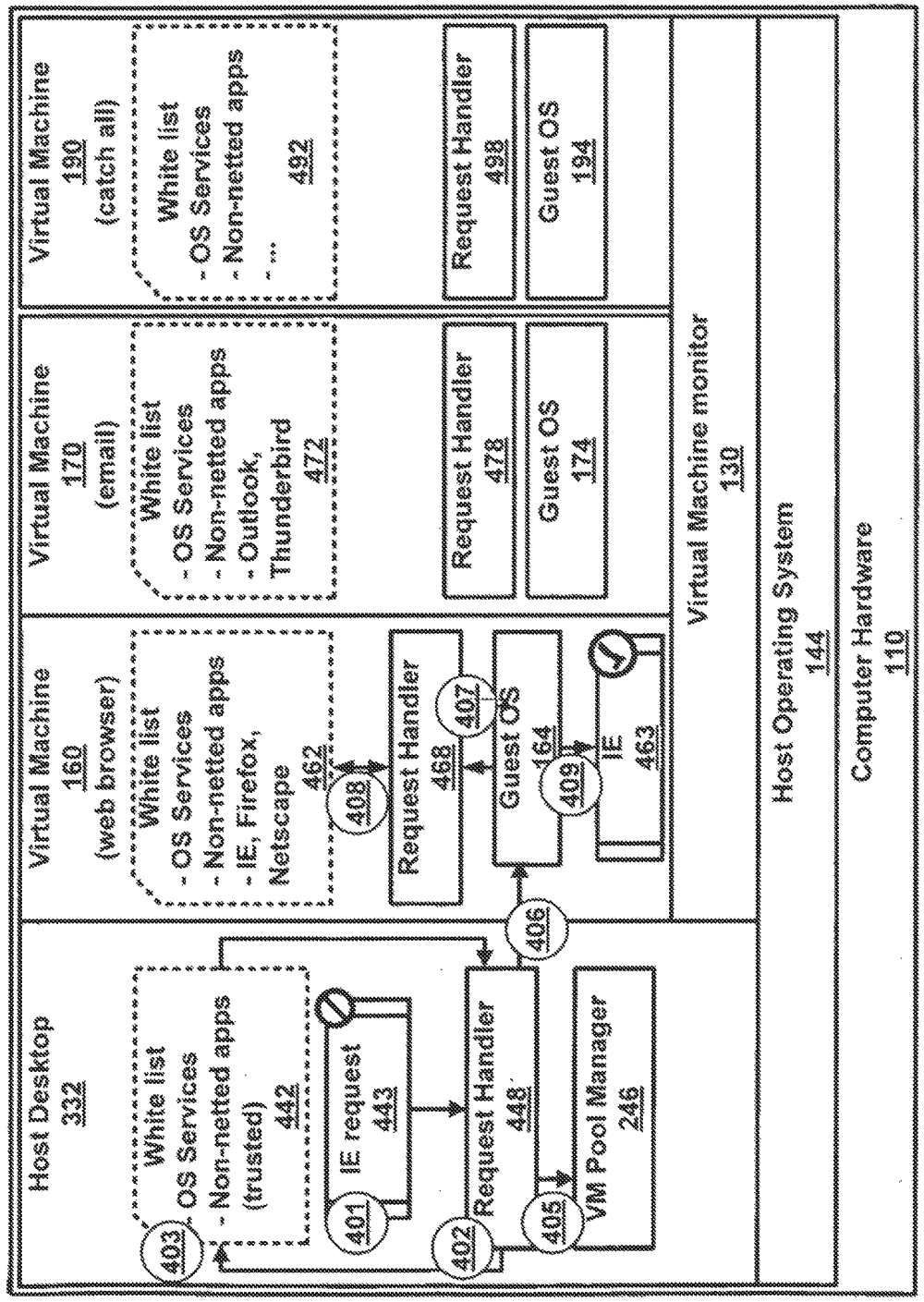
FIG. 4 is a block/flow diagram of an aspect of an embodiment of the present invention.

FIG. 4 is a diagram shows an example of how an application requests can be directed to an assigned machine. Several new elements that are part of the system are shown in this diagram. These new elements include optional white lists (442, 462, 472 and 492) and request handlers (448, 468, 478, and 498).

The white lists (442, 462, 472 and 492) list applications and services that are allowed to execute on the machine in which they reside. For example, white list 442, which resides on the host desktop, does not list any internet applications, but does list local services and non-netted applications. White list 462 which resides on virtual machine 160 lists several internet browser applications as well as local services and non-netted applications. White list 472 which resides on virtual machine 170 lists several internet email applications as well as local services and non-netted applications. White list 972 which resides on virtual machine 190 is a catch-all machine, and as such does not exclude any internet applications. These limitations defined in the white lists are examples. A system could be set up to list any desired applications to run on a virtual machine. Described here is just a suggested configuration.

The request handlers (448, 468, 478, and 498) perform several functions (not necessarily in the following order). First, they intercept system calls. Second, they determine if calls should be forwarded. Third, where the calls should be forwarded. And fourth, the request handlers forward the calls. To determine where the calls should be forwarded, the request handlers (448, 468, 478, and 498) may examine white lists on their machine (442, 462, 472 and 492 respectively), and the virtual machine pool manager 246.

In this example, a user, interacting with the host desktop 332 generates a request 443 to start up an instance of Internet Explorer at 401. This request is intercepted by request handler 448 at 402. The request handler 448 inspects white list 442 at 403 and learns that Internet Explorer is not allowed to run on the host 144. The request handler 448 then queries the virtual machine pool handler 246 for a virtual machine to forward the request to at 405. In this example, the virtual machine pool handler 246 determines that the request 443 should be forwarded to virtual machine 160. If virtual machine 160 was not running or awake, the virtual machine pool handler 246 may send commands to the virtual machine monitor to create or wake up the machine 160. Once the virtual machine pool manager 246 believes virtual machine 160 is running, it responds back to request handler 448 to forward the IE request 443 to virtual machine 160.

At 406, request handler 448 forwards the IE request 443 to the guest operating system 164 on virtual machine 160. The guest operating system 164 then forwards the IE request 443 to request handler 468 at 407. Request handler 468 which will forward the request 443 to request handler 468. Request handler 468 inspects white list 462 at 408 and learns that Internet Explorer is allowed to run on the virtual machine 160. Based on this knowledge, request handler 468 allows the guest OS to start an instance of IE (463) at 409.

Figure 5:
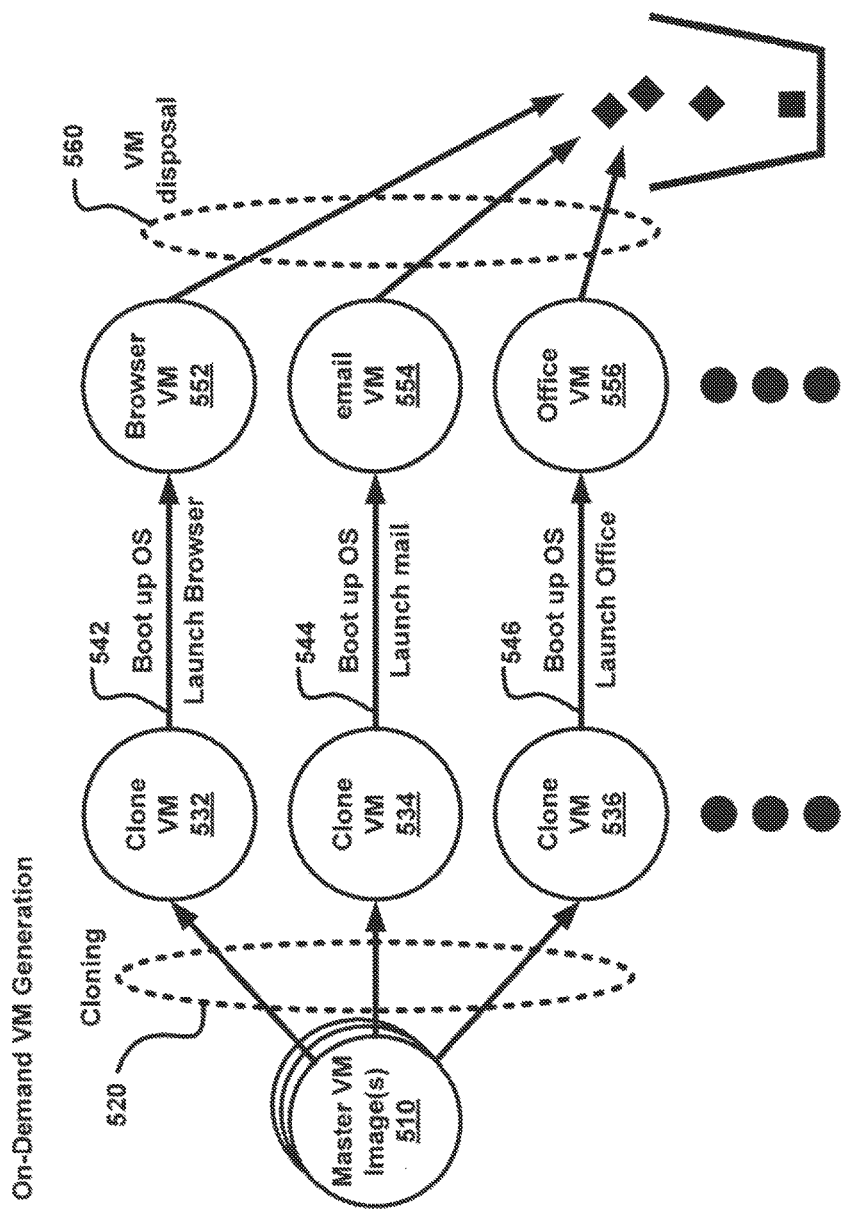
FIG. 5 is a diagram showing on-demand virtual machine cloning as per an aspect of an embodiment of the present invention.

FIG. 5 shows the creation of on-demand virtual machines (552, 554, 556, . . . ) to handle all of the various applications that need to be run. The system starts out with at least one master virtual machine image 510. These images should be pristine snapshots of running operating systems. In some cases, the snapshot can include a running application.

At 520, copies of the virtual machine images 510 can be cloned onto the appropriate virtual machines 532, 534, and 536. Once the machines are cloned, the operating system may be booted and an appropriate application launched to make the virtual machine an application specific virtual machine. For example: cloned virtual machine 532 can be booted with an OS and a browser launched at 542 to generate a browser application specific virtual machine 552; cloned virtual machine 534 can be booted with an OS and an email application launched at 544 to generate an email application specific virtual machine 554; and cloned virtual machine 536 can be booted with an OS and one or more office applications launched at 546 to generate an office application specific virtual machine 556.

For the sake of temporal efficiency, several virtual machines may be started on a system and then put to sleep by the virtual machine manager 130 until they are needed. This may be a more efficient method of running a system due to the fact that waking up a virtual machine may take less time than creating one. Finally, the virtual machines 552, 554, and 556 may be disposed of at 560. This disposal may occur at different times such as after the applications are closed, by user request, or after a predetermined time limit. Disposal may be done by numerous methods including reverting the virtual machine back to its initial state or destroying it completely. In some cases, a user may wish to examine the virtual machine for possible contamination after running it. In this case the virtual machine image may be moved to a secure site for examination.

"One program at a time" means dedicating a virtual machine to an application or type of application. So for example, if we wish to dedicate a virtual machine to mail applications, then this machine will be assigned to run as many mail applications as a user may desire. This may be a single instance of a mail application, or multiple instances of the mail application. Using this scheme, all mail interactions with an external network will be through a virtual machine dedicated to processing mail applications.

Figure 6:
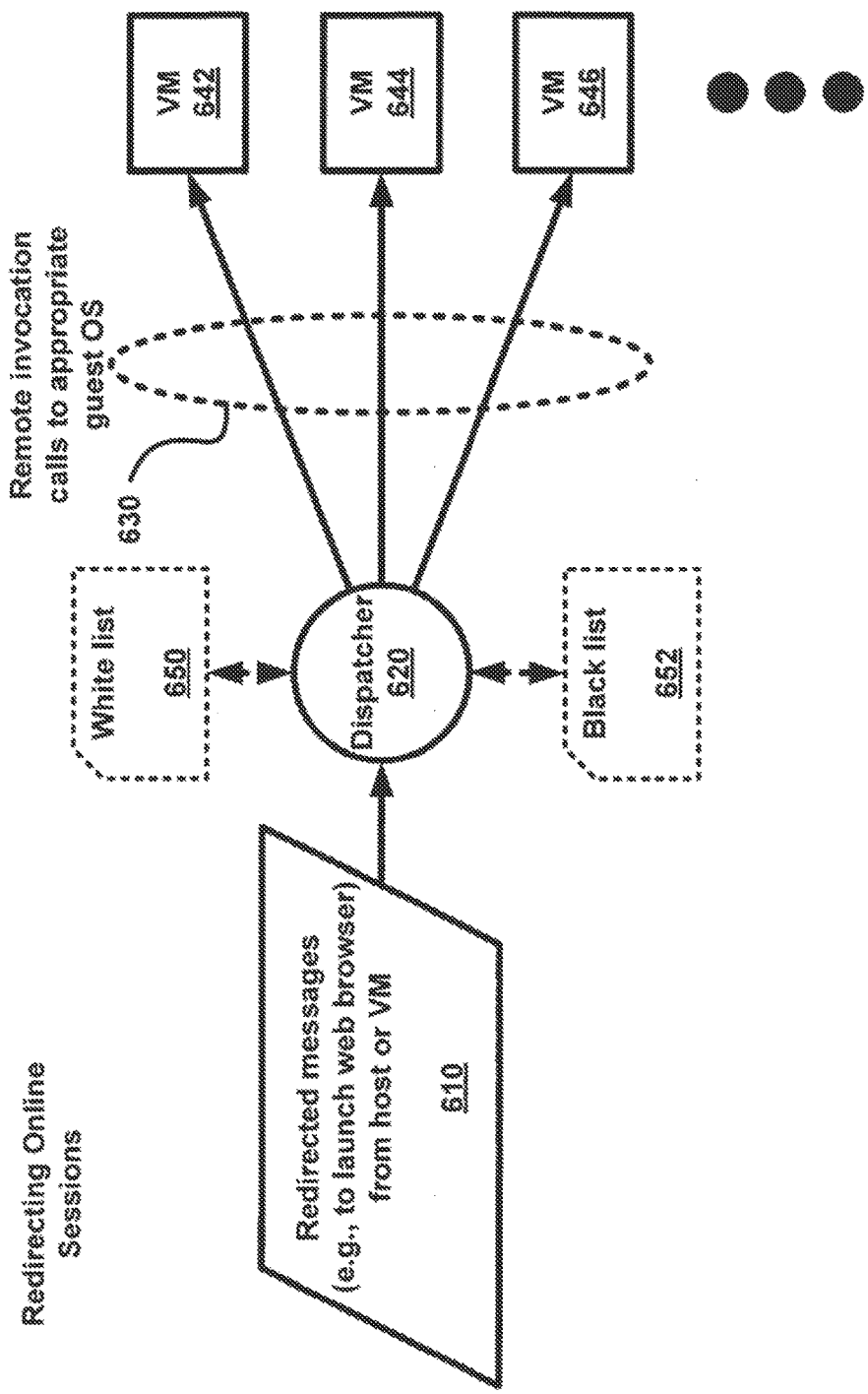
FIG. 6 is a diagram showing the redirection of online sessions as per an aspect of an embodiment of the present invention.

FIG. 6 shows how a request handler can redirect an application execution request. When you initiate an application request, either on the host or on a guest Virtual machine 642, 644, or 646, that application request can be intercepted. Interception may be performed using numerous utilities. An example of a program that can be used to intercept requests on Microsoft windows machine is Microsoft Detours. The intercepted messages 610 may be redirected to the dispatcher 620. The dispatcher 620 may use a program permissions list (either host program permissions list or guest program permissions list as appropriate). The program permissions list may be a white list 650, a black list 652, or some combination thereof. In the case of the white list 650, the dispatcher 620 may compare the redirected execution request 610 with the white list 650. If it's determined that the application associated with the execution request 610 is not on the white list 650, the intercepted messages 610 is redirected to the appropriate virtual machine (642, 644, or 646) using a remote invocation call 630. This is done by the dispatcher 620 call for the application to run on a remote machine by talking to a dispatcher on that remote machine. In the case of the black list 652, the dispatcher 620 may compare the redirected execution request 610 with the black list 652. If it's determined that the application associated with the execution request 610 is on the black list 652, the intercepted messages 610 is redirected to the appropriate virtual machine (642, 644, or 646) using a remote invocation call 630. This is done by the dispatcher 620 call for the application to run on a remote machine by talking to a dispatcher on that remote machine.

If a white list 650 is in use and it is determined that the application associated with the execution request 610 is on the white list 650, the intercepted messages 610 are directed to the local machine's operating system for execution. If a black list 652 is in use and it is determined that the application associated with the execution request 610 is not on the black list 652, the intercepted messages 610 are directed to the local machine's operating system for execution.

Figure 7:
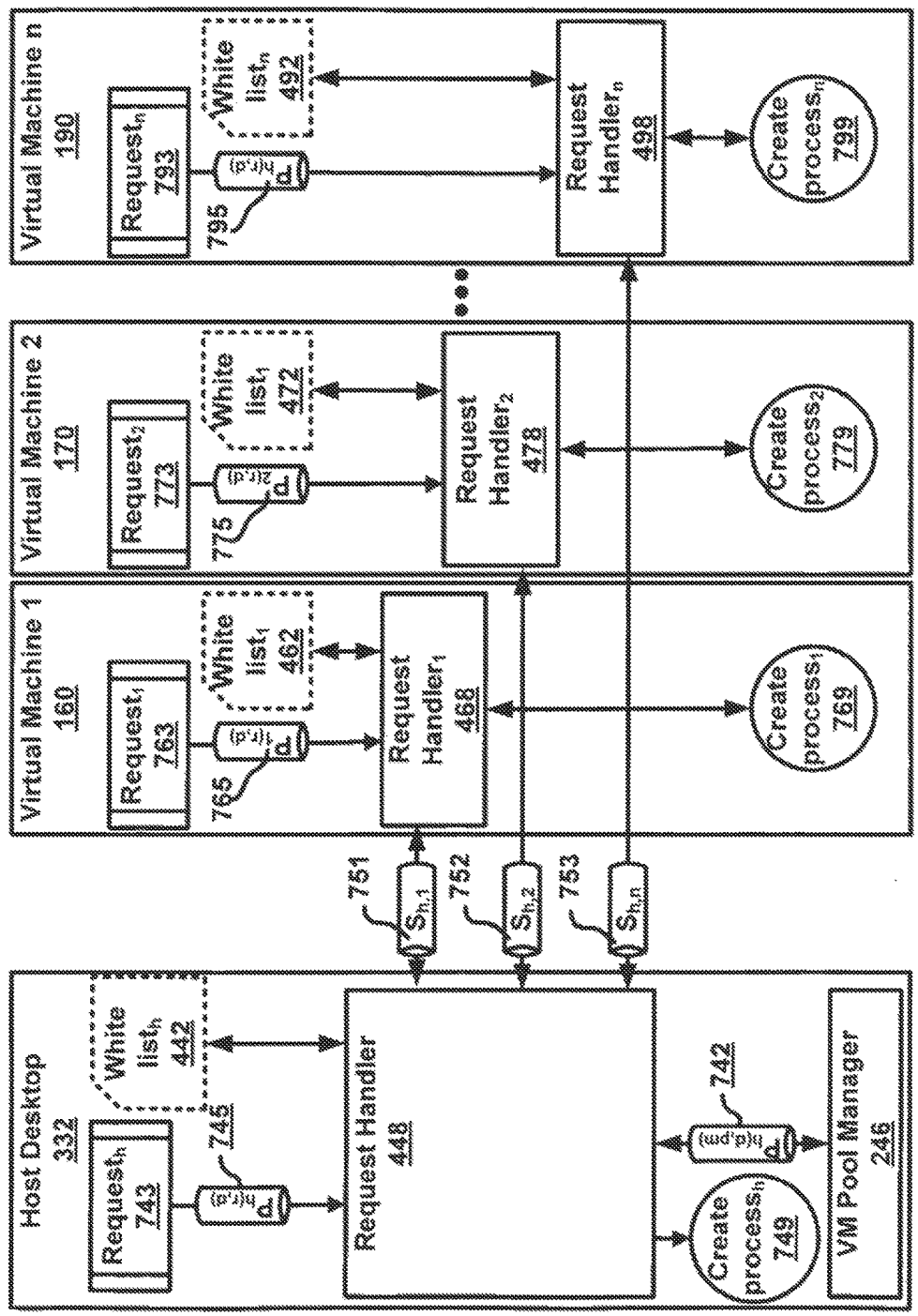
FIG. 7 is a diagram showing message passing as per an aspect of an embodiment of the present invention.

FIG. 7 shows more detail on the communication pathways between the host machine 140 and the guest virtual machines (160, 170 and 190). Although the communication channels may utilize many different techniques, this embodiment is showing the use of pipe servers and socket servers. The request handler 448 on the host is a client that is used to send requests to the virtual pool manager 246 and to the guest request handlers 468, 478, and 498. When a request to run a local application 743 on the host is generated, the request 743 is directed through a logical pipe 745 to the host request handler 448. The host request handler 448 inspects the host white list 442 to determine if the application specified by the request 743 is allowed to run locally or of it needs to run remotely. In general, applications that are not capable of accessing a network will be allowed to run locally while applications that are network access capable will be required to run remotely. This can be accomplished by keeping network access capable applications off the host white list 442.

In the case that the request 743 is requesting an application that is not on the host white list 442, the host request handler 448 will communicate with the pool manager 246 through an internal pipe 742 to determine which guest virtual machine (160, 170 or 190) the local application 722 needs to run on. The pool manager 246 then sends a message to the host request handler 448, which will in turn send a request 743 to the appropriate request handler (468, 478 or 498) through a socket communications channel (751, 752 or 753). In the case that the request 743 is requesting an application that is on the host white list 442, the host request handler 448 will attempt to create the process 749 by forwarding the request 743 to the local operating system.

A similar process occurs when a request (763, 773 or 793) is made on one of the virtual machines (160, 170 or 190). The request (763, 773 or 793) is intercepted by the local request handler (468, 478 or 498) through an internal pipe (765, 775 or 795). The local request handler (468, 478 or 498) will inspect the local white list (462, 472 or 492) to determine if the application specified by the request (763, 773 or 793) is allowed to run locally or of it needs to run remotely. Applications that are on the white list (462, 472 or 492) will be allowed to run locally while applications that not on the white list (462, 472 or 492) will be required to run remotely.

In the case that the request (763, 773 or 793) is requesting an application that is not on the host white list (462, 472 or 492), the request handler (468, 478 or 498) will attempt to communicate with the host request handler 448 through a socket communications channel (751, 752 or 753). The host request handler 448 will communicate the request (763, 773 or 793) to the pool manger 246 through an internal pipe 742 to determine which guest virtual machine (160, 170 or 190) the application needs to run on. The pool manager 246 then sends a message to the host request handler 448, which will in turn send a request 743 to the appropriate request handler (468, 478 or 498) through a socket communications channel (751, 752 or 753). In the case that the request (763, 773 or 793) is requesting an application that is on the host white list (462, 472 or 492), the local request handler (468, 478 or 498) should attempt to create the process (769, 779 or 799) by forwarding the request (763, 773 or 793) to the local operating system.

The pool manager 246 should be configured to know which machines run which applications. So, if for example, a user makes a request 763 to run an email client from a virtual machine 160 dedicated to running web browsers, the email program will not be on the white list 462 of the web browser machine. So the guest request handler 468 will talk to the pool manager 246 through the host request handler 448 to determine which machine (170 or 190) should run the email program. In some embodiments the host request handler 448 can forward a request to start the email program directly to the guest request handler 478 on the appropriate guest virtual machine 170. In another embodiment, the pool manager 246 can return to the guest request handler 468 through the host request handler 448 which machine (170 or 190) should run the email program and the guest virtual machine 468 will forward the request directly to the appropriate web browser dedicated machine 478.

In the case that a request (743, 763 or 773) is made on the host 140 or one of the application specific virtual machines (160 and 170) that is for an application that is not on one of their white lists (442, 462 or 472), the pool manager 246 can direct the request using the mechanisms just described to a catch-all machine which could be 190.

Figure 8:
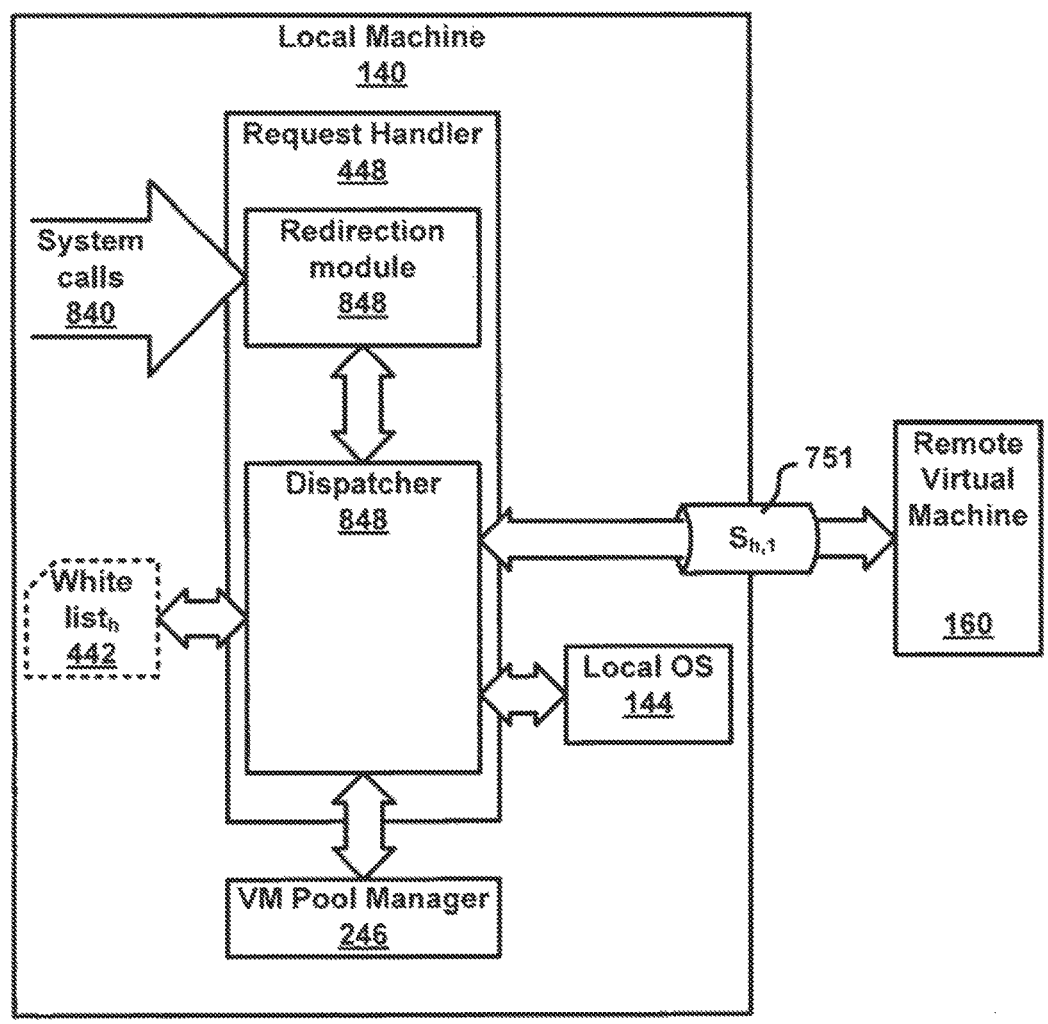
FIG. 8 is a diagram of a request handler module as per an aspect of an embodiment of the present invention.

FIG. 8 is a diagram showing how the request handler works. The request handler 448 on the host captures system calls that come from applications. The redirection module in the request handler determines if it's a file access call or a process creation call. If it's a process creation system call, then it consults a white list to determine if it's allowed to run locally. If it is allowed to run locally, then the system call is allowed to flow through and the process is created on the host. If it is not on the white list then the dispatcher will redirect the call to a remote machine determined by the pool manager 246. In the case of a file access, if the file access is to a local drive on a local machine, then the file access is allowed to execute as is. If it is to a mount point on the secure virtual file system (SVFS), then the dispatcher will first seek approval from the user via keyboard input, then given approval to access the SVFS, the dispatcher will redirect the file access system call to the SVFS machine, which is determined by the pool manager 246.

Figure 9:
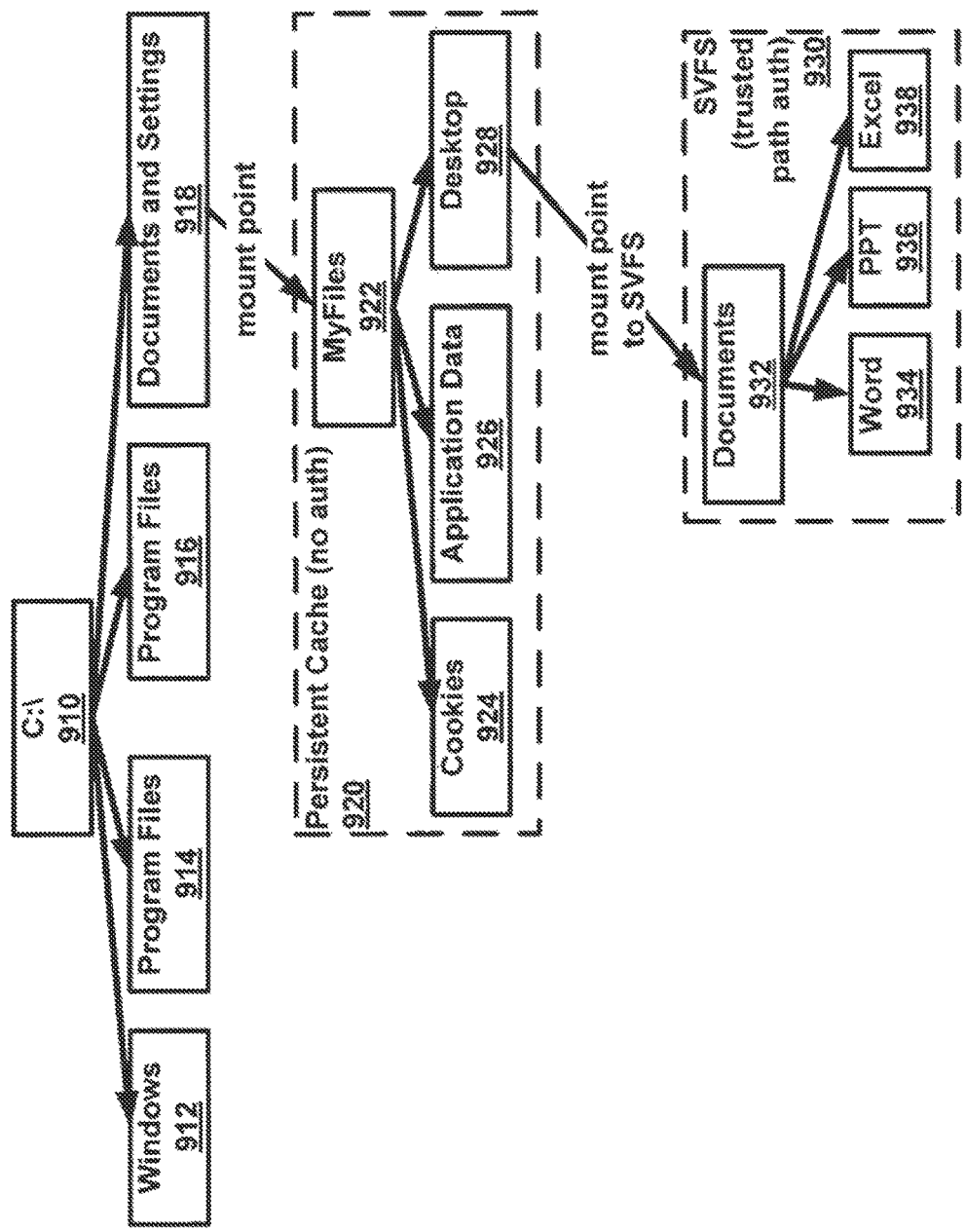
FIG. 9 is a diagram of an example file system as per an aspect of an embodiment of the present invention.

FIG. 9 is a diagram showing an example file system for a host or guest machine. The machines can have a local drive 910 with a normal complement of directories 912, 914, 916, and 918 that should exist only for the length of the virtual machine's life. The machine may also have a mount point for a persistent cache 920 containing data such as files 922, cookies 924, application data 926 and desktop data 928. These files provide temporary and dynamic data for several applications such as web browsing to provide seamless experiences between different application sessions. However, since the data in this is not particularly valuable, no user authentication or approval is required in this embodiment for the guest virtual machines to access this persistent cache. In this embodiment, the persistent cache is mounted from a directory on a file server on the SVFS to all guest machines to provide seamless application usage across sessions. In other embodiments, the persistent cache can reside on another file server. In addition, user approval or authentication can be required in other embodiments for a guest VM to access this cache.

To save data past the refresh or destruction of a virtual machine, the virtual machine may desire to mount a secure virtual file server (SVFS) 930. This device may be used to store document data 932 such as Excel data 938, Power Point data 936, and Word data 934. However, to ensure that a legitimate user is only accessing this drive, it may be desirable to make this a limited access file server using standard user password authentication techniques available with most file servers.

In many cases, the limited access file server 930 can require a user to authenticate themselves at least during their first access, maybe more often. On a virtual machine, anytime the user attempts to read from or write to (access) the persistent file server 930, that access itself is redirected. So, if a user is on a guest machine tries to access the persistent file server 930, that access request can be redirected to the host machine. The host can take a look at the access and the access is interrupted. A pop up dialog box can ask the user for confirmation that they do indeed want to access the persistent file server 930. One possible way to do this is with a mouse click acknowledgment. Another way to make this acknowledgement is by a keyboard stroke, requiring a password or PIN authentication, or through the use of a Turing test solvable only by a human. The acknowledgement verifies that the user does want to access data. This should prevent malicious code or users from writing files to persistent storage without the console user's permission. Likewise in order to retrieve files from the persistent storage device to the guest OS, it may also be advantageous to have the user authenticate the file transaction. In one embodiment, the approval once granted applies to all file accesses to that file directory from that application for that session. In another embodiment, each individual access to that file may require user approval.

Figure 10:
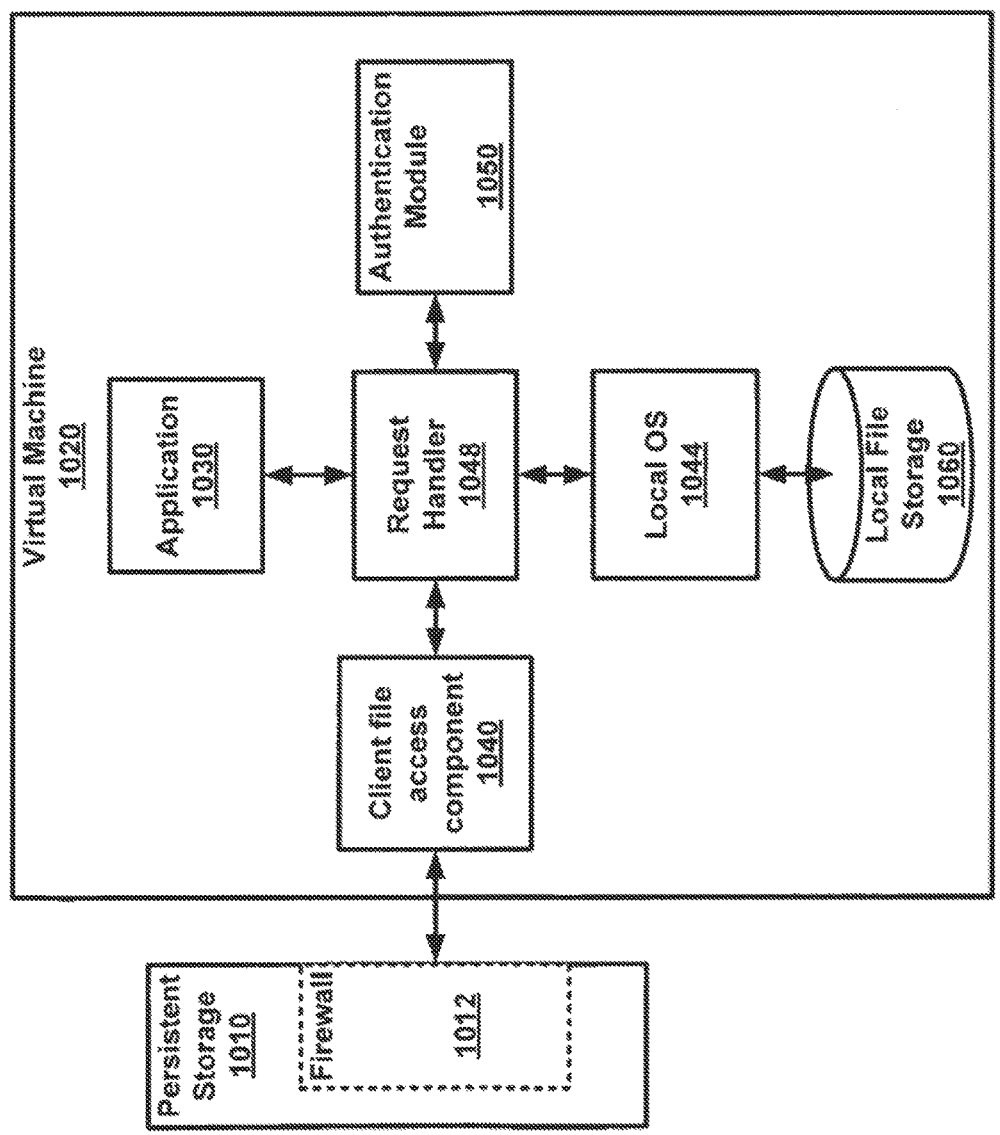
FIG. 10 is a diagram showing persistent storage access as per an aspect of an embodiment of the present invention.

FIG. 10 is a diagram showing how the file access can work. When applications 1030 working on a virtual machine 1020 attempt to access a file system, the file system access system calls are intercepted by a request handler 1048. If the file access is local or to the persistent cache 920, the system call is allowed to execute as is and it stores or retrieves from local file storage 1060 through the local OS 1044 or to the persistent cache 920. If the file access is to a the SVFS mount point, prior to letting that request go, the request handler 1048 calls an authentication module 1050 which may require a user to navigate a dialog box to approve the file system request in order to prove to the system that they are not actually malicious code. This navigation should allow a user to acknowledge and approve the remote file access at which point the request back on the virtual machine is allowed to create its client connection through a client access component 1040 to the persistent storage server 1010. The persistent storage may be pointed to by the virtual machine pool manager 246. Then the connection is made and the application 1030 is allowed to read from or write to the persistent storage 1010. As an extra measure of safety, it may also be advantageous for the persistent file storage 1010 to utilize a firewall mechanism 1012 (or equivalent type mechanism) to filter out unwanted requests.

Figure 11:
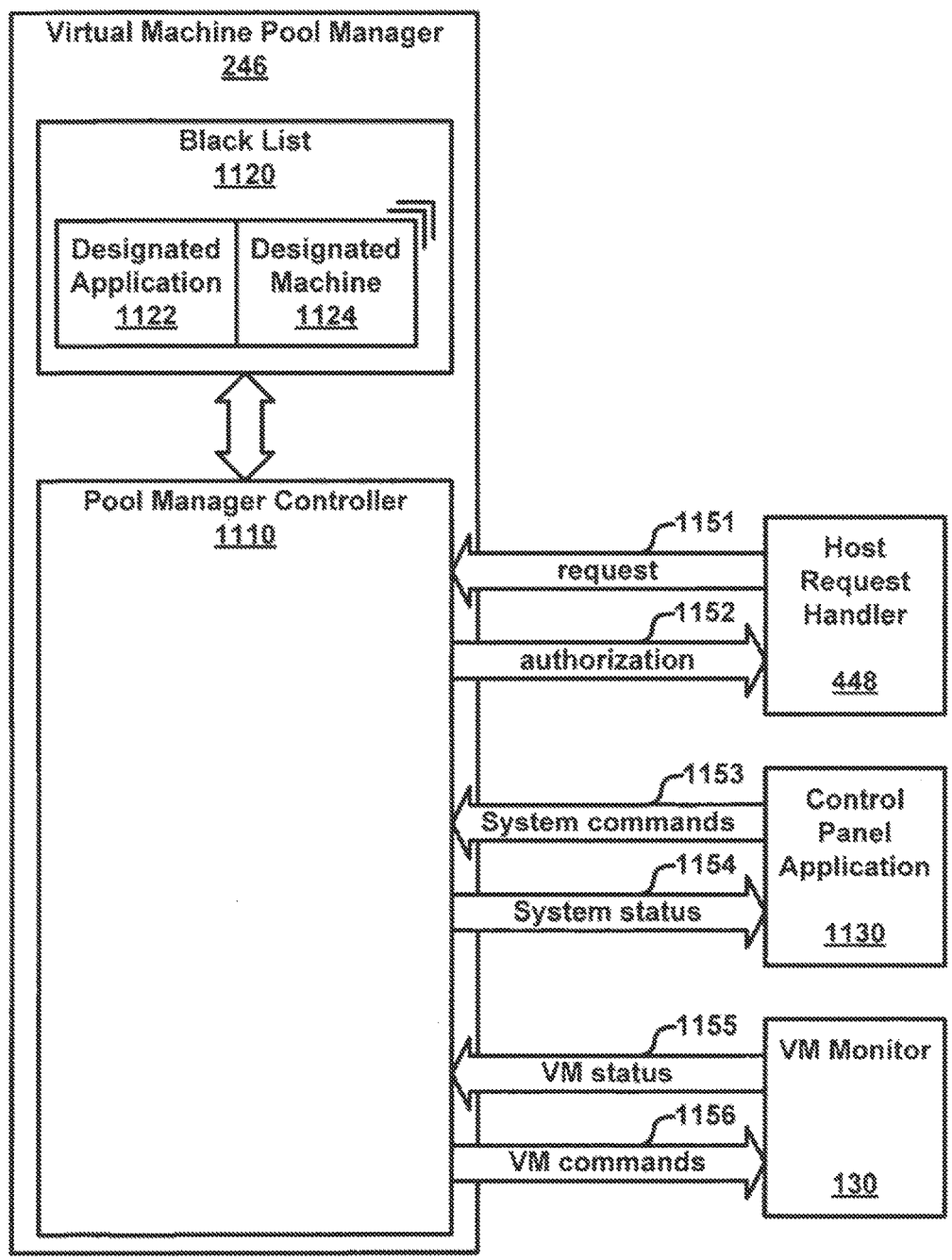
FIG. 11 is a diagram of a virtual machine pool manager as per an aspect of an embodiment of the present invention.

FIG. 11 show the pool manager 246. The virtual machine pool manager 246 runs on the host and is responsible for resource management of the guest virtual machines. It maintains a black list 1120 which lists which designated applications 1122 run on which designated machines 1124. For example the list can have an entry that designates that web browsers run on a web browser specific virtual machine and another entry that designates that office spreadsheet programs run on an office spreadsheet specific virtual machine.

When an application is attempted to be run, the host request handler 448 sends a request 1151 to run that application to the virtual machine pool manager controller 1110 which will look at the request 1151 and determine if that machine is currently running. It can do that by grabbing the status 1155 of the virtual machine from the virtual machine monitor 130. If it is not, then it will create that machine by sending VM commands 1156 to the virtual machine monitor module 130. If it is running, then it provides authorization 1152 to the host request handler 448 to execute the process creation on the specified machine. A control panel 1130 may also enable manual control over the virtual machine resources. The control panel application should be able to provide system commands 1153 to the pool manager controller 1110 as well as receive system status 1154 from the pool manager controller 1110.

The control panel 1130 gives the ability to create and destroy virtual machines and refresh virtual machines back to their original state. It can refresh virtual machines by reverting the virtual machine to a previously saved snapshot of the guest operating system in a pristine state. Refresh of the virtual machine is when a user for one reason or another decides he wants to reset the state of the virtual machine back to its initial pristine state. For example, good reasons to refresh a machine include: a virus having been detected on the virtual machine, or the virtual machine has just been open for too long (thus increasing the possibility of a contamination).

In some cases, if it is a web browser, you could save the address and return to the location. However, in many cases, the purpose of a refresh is to get the machine back to a safe condition. So for example, if a user were browsing at a celebrity site that might contain possibly damaging content, the user probably would not want to return to the site because of its possible negative effects on the system, but would rather start fresh with a new pristine machine.

Other functions of the pool manager controller 1110 include: add virtual machines of particular types such as a windows virtual machine, a Linux virtual machine or a variation of those. We could create a windows virtual machine with office running or create a windows virtual machine with an email application running. This can give a user control when they create a new virtual machine to designate what kind of a virtual machine to create including an isolated virtual machine that has no access to the internet or no access to persistent storage or some combination thereof.

When the machine starts up, it can consult a configuration file. The configuration file can instruct the pool manger controller how many virtual machines to create. How many are going to run live, how many are going to be put asleep in the virtual machine pool. And their configuration file can provide user interface locations to allow a user to designate some of these parameters to their liking or for the best performance of the machine.

The user can also through the control panel 1130 designate parameters for the black list 1120. So they can say which machines 1124 they want to run which applications 1122 and that can be used to update the black list 1120. A user might designate that they always want to have a Microsoft Office machine and further designate what applications they run on that machine that is created at startup.

The status 1156 of the virtual machine can also convey the security status of the virtual machines. For example, audit logs created by commercial security tools (like antivirus or root kit detectors) can be captured. When a violation of a virtual machine is detected, then that status can be used to update the control panel 1130 to inform the user that they have a machine where a compromise has been detected. The control panel 1130 can then be used to refresh or kill that virtual machine. Likewise, one could also keep track of the amount of time that a guest OS in a virtual machine has been open. If it has been open for too long, the status can be changed from green to yellow, or yellow to red. This can give a user an indication that it is time to refresh a virtual machine. Of course, one skilled in the art will recognize that these types of response actions could also be automatic.

Figure 12:
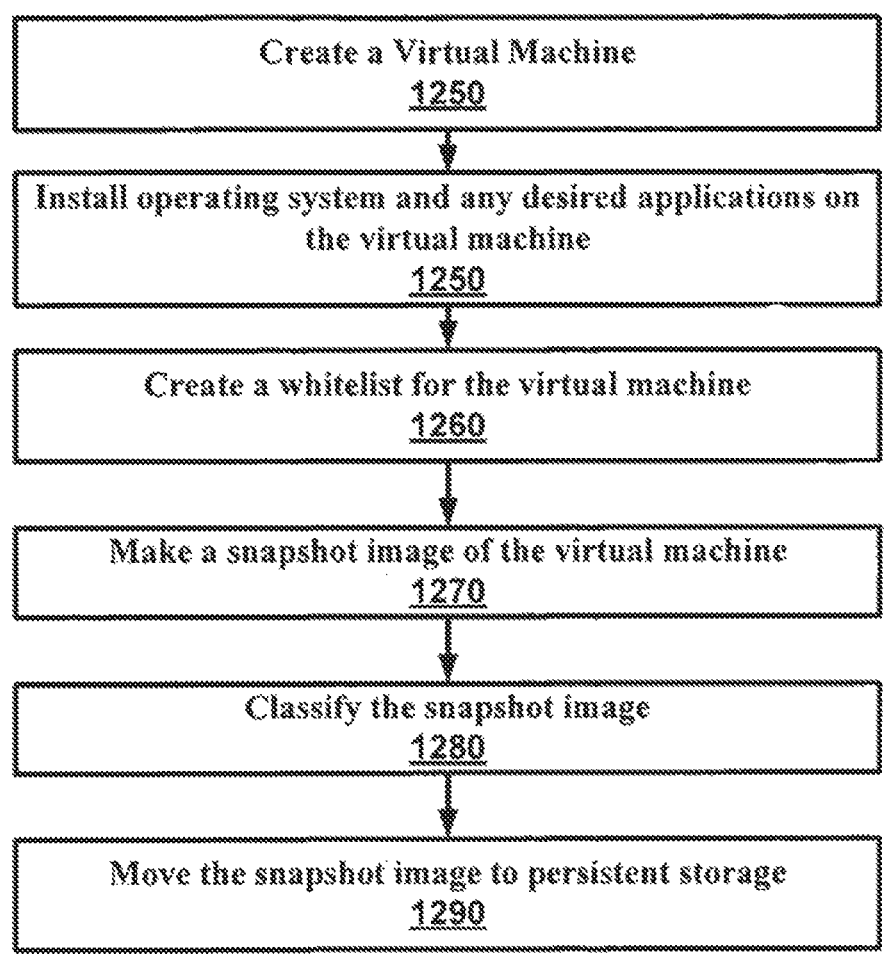
FIG. 12 is a flow diagram of the creation of a virtual machine image as per an aspect of an embodiment of the present invention.

FIG. 12 is a flow chart shows actions that may be taken to create a new operating system reference image 145. First, one should create a virtual machine (1250). Preferably, this virtual machine is not connected to a network or appliance that could corrupt the virtual machine or any software loaded on it. An operating system and any desired applications may be loaded and configured on the virtual machine (1250). A white list should be created that lists all of the loaded software and any other software that may be allowable to run on the currently set up arrangement (1260). A snapshot image 145 can be made of the configured system (1270). The snapshot may be classified at (1280). The classification should allow a user or system to identify the image 145. This may be particularly useful when a series of images 145 are created for use on different virtual machines. The classification may be made part of the image 145 (such as in an identifying header), or kept separate from the image 145. Finally, the snapshot image may be moved to persistent storage at 1290 for use by the virtual machine pool manager 246 when it creates new virtual machines.

Figure 13A:
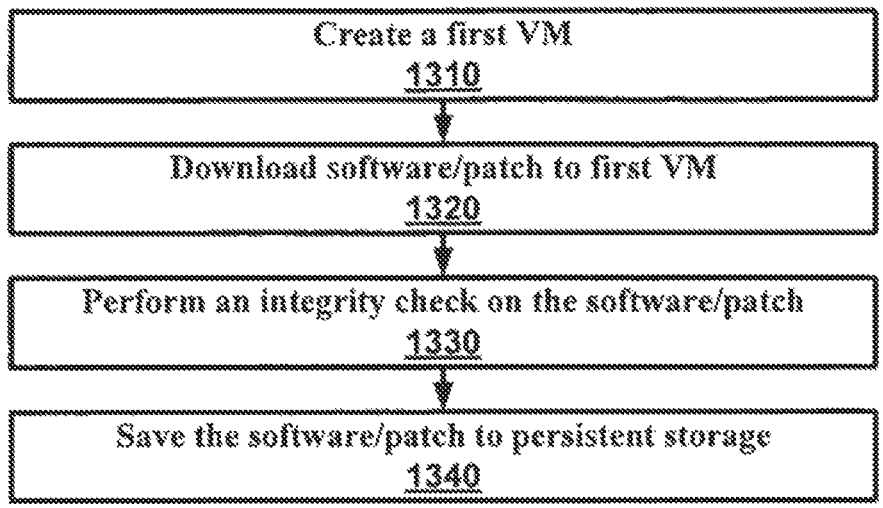
FIG. 13A is a flow diagram of the download of a software patch as per an aspect of an embodiment of the present invention.

In addition to creating a reference image 145, it may be desirable to also be able to allow a user to update or patch the image. FIG. 13A is a flow diagram showing how to safely download new software (or software patch) to embodiments of the virtual work system for further use. To start this process out, one should attempt to acquire a clean copy of the new software or patch. In the case that the software is distributed on a trusted media such as a CD, that media may be used directly. However, some software and patches need to be downloaded from a network. To do this, one may create a clean virtual machine that can connect to a network for the purpose of downloading software or patches at (1310). The software or patch may then be safely downloaded at 1320. If desired, one could perform an integrity check on the software or patch by checking its MD5 hash or its digital signature released with the software ore patch by the software vendor. A user may copy the software or patch to persistent storage at 1340 for further use by a host or guest machine.

Figure 13B:
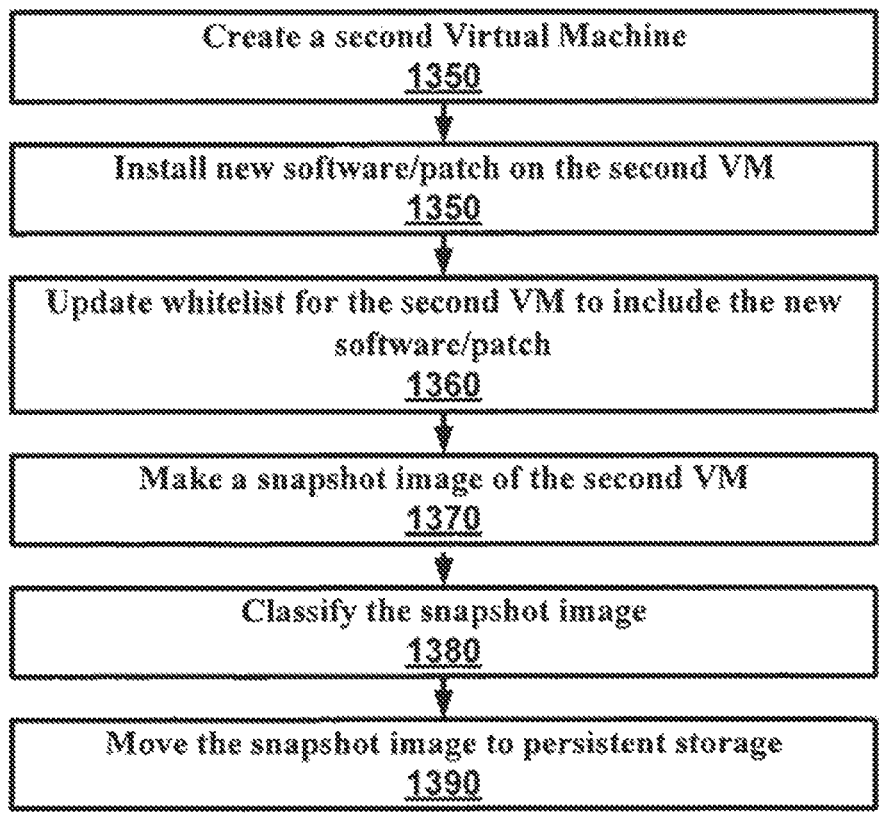
FIG. 13B is a flow diagram of the updating of a virtual machine image with a software patches per an aspect of an embodiment of the present invention.

FIG. 13B is a flow diagram showing how to create a new operating system reference image 145 using the downloaded software or software patch. A second virtual machine may be created at 1350. The new software or patch may be loaded into that virtual machine at 1350. Although it may be desirable to ensure that the loaded software is in pristine condition, the software or patch can be loaded from any source including the persistent storage or other computer readable storage medium (e.g. a CD, DVD, flash drive, etc.). The white list that is associated with the new image can be updated to reflect the new changes to the image at 1360. A snapshot of the virtual machine may also be taken at 1370 of the system with the new configuration. Like before, it may also be desirable to reclassify this new image at 1380. Finally, the snapshot may be copied to persistent storage at 1390 for further use by a host or guest machine.

Comparison to State of the Art

VMMs today are used to run multiple operating systems side by side on the same hardware to provide support for different operating systems (Windows and Linux) or to provide guarantees of separation between different classification levels in multi-level secure (MLS) military applications. In the multi-level secure system configuration, each operating system is configured to provide a separate computing platform with the net effect of combining multiple computers on a single hardware platform. It is functionally equivalent to having multiple computers on your desk—each operates independently, but all share the same hardware.

The approach described here uses virtual machine technology as a means for launching applications each in their own guest operating system to provide strong guarantees of isolation for that application. Rather than running different operating systems independently, the presently described approach is to run each application in its own virtual machine, thus providing strong guarantees of security while providing transparence to the user experience that a different machine is running. Another key difference is that under the MLS scheme, the machines are persistent. Once compromised by malicious code or attack, the MLS machine can potentially remain compromised. The window of exposure to attack is also equivalent to current desktop systems. That is as long as the machine remains connected to the network, it remains exposed to attack. In the embodiments described here, the machines are transient. The machines can last only for the duration of the application session. After the application session is complete, the machine may be killed and the window of exposure terminated. Furthermore, a "clean" machine may be started on each new application session, which means any changes made to the machine during a prior session, e.g., by malicious code or attack, are no longer present in the current instantiation.

Another relevant point of comparison is to software "wrapper" or mediation technology. Software wrappers are used today to "wrap" or encapsulate an application with a prophylactic layer of software redirection calls that mediate access to system resources. The wrappers can enforce a policy that is written for each application. The idea behind software wrappers is that you can constrain an application's behavior from malicious use of the system by mediating its access to the system. It requires a software mediation infrastructure that runs on top of the host OS.

The approach of the embodiments described here is fundamentally different in how it approaches this problem. Rather than "wrapping" an application, the embodiments create a whole new machine in which it runs the protected application. Failures in the policy definition and implementation in the wrapping layer of the wrapper technology can lead to a compromised system. The IC system involves no wrapping and is in fact root secure. Meaning that failures in the application's security that result in the complete compromise of the system running the application will not compromise the host system. Also, one of the most vexing problems in wrapper/mediation approaches is the requirement to define a policy for each application and the fact that many multi-functional applications such as Web browsers cannot be effectively constrained because of the wide range of functionality they must possess to be effective. In the currently described approaches, no policy definition or constraints are necessary. The application has full access to the machine it runs on with no residual consequences.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) of personal data. However, one skilled in the art will recognize that embodiments of the invention could be used where more than one application is run within a Virtual machine running a guest OS.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. An apparatus, comprising:
a memory; and
a processor, the processor executing a request handler and a virtual machine manager,
the request handler configured to receive a request to execute a program on a host operating system,
the request handler configured to determine, in response to the request, that the program does not have permission to execute on the host operating system and outside a virtual machine based on an indication of the program not being included on a list indicating which programs are allowed to operate on the host operating system and outside a virtual machine,
the virtual machine manager operatively coupled to the request handler, the virtual machine manager configured to select a guest virtual machine based on a program type associated with the program,
the request handler configured to send the request to the guest virtual machine such that the guest virtual machine executes the program in response to the indication of the program being included on a list indicating which programs are allowed to operate within the guest virtual machine.

2. The apparatus of claim 1, wherein the virtual machine manager is configured to initiate the guest virtual machine in response to selecting the guest virtual machine.

3. The apparatus of claim 1, wherein the program is a first program,
the request handler configured to send a request to execute a second program to the guest virtual machine such that the guest virtual machine executes both the second program and the first program during a time period in response to an indication of the second program being included on the list indicating which programs are allowed to operate within the guest virtual machine, the second program being associated with the program type.

4. The apparatus of claim 1, wherein the program is a first program and the guest virtual machine is a first guest virtual machine,
the request handler configured to send a request to execute a second program to a second guest virtual machine such that the second guest virtual machine executes the second program, a program type associated with the second program being different than the program type associated with the first program, an indication of the second program not being included on the list indicating which programs are allowed to operate within the first guest virtual machine.

5. The apparatus of claim 1, wherein the request handler is a first request handler, the first request handler being associated with the host operating system, the apparatus further comprising:
a second request handler, the second request handler being associated with the guest virtual machine, the second request handler configured to receive from the program a request to access a persistent storage associated with the guest virtual machine, the second request handler configured to allow the program to access the persistent storage in response to a user authenticating the request to access the persistent storage.

6. The apparatus of claim 1, wherein the program is a first program,
the request handler configured to receive a request to execute a second program on the host operating system,
the request handler configured to determine, in response to the request to execute the second program, that the second program has permission to execute on the host operating system and outside a virtual machine based on an indication of the second program being included on the list indicating which programs are allowed to operate on the host operating system and outside a virtual machine.

7. An apparatus, comprising:
a memory; and
a hardware processor operatively coupled to the memory and configured to implement a request handler at least partially stored in the memory and a virtual machine manager at least partially stored in the memory,
the request handler configured to receive a request to execute a program on a host operating system, the request handler configured to determine, in response to the request, that the program does not have permission to execute on the host operating system and outside a virtual machine, the virtual machine manager operatively coupled to the request handler, the virtual machine manager configured to select a guest virtual machine from a plurality of guest virtual machines for the program, each guest virtual machine from the plurality of guest virtual machines being associated with a list indicating which programs are allowed to operate within that guest virtual machine, the virtual machine manager configured to perform at least one of:

define the guest virtual machine;
put the guest virtual machine to sleep;
terminate the guest virtual machine;
wake-up the guest virtual machine;
receive the request to execute the program from the request handler; or
respond to the request to execute the program from the request handler, the request handler configured to send the request to the guest virtual machine such that the guest virtual machine executes the program in response to an indication of the program being included on the list indicating which programs are allowed to operate within the guest virtual machine.

8. The apparatus of claim 7, wherein the hardware processor is configured to implement a virtual machine monitor, the virtual machine monitor configured to host the guest virtual machine on the hardware processor.

9. The apparatus of claim 7, wherein the virtual machine manager is configured to select the guest virtual machine for the program based on a program type associated with the program.

10. The apparatus of claim 7, wherein the request handler is a first request handler, the first request handler being associated with the host operating system, the hardware processor is configured to implement a second request handler, the second request handler being associated with the guest virtual machine, the second request handler configured to receive from the program a request to access a persistent storage associated with the guest virtual machine, the second request handler configured to allow the program to access the persistent storage in response to a user authenticating the request to access the persistent storage.

11. The apparatus of claim 7, wherein the program is a first program, the request handler configured to receive a request to execute a second program on the host operating system,
the request handler configured to determine, in response to the request to execute the second program, that the second program has permission to execute on the host operating system and outside a virtual machine.

12. The apparatus of claim 7, wherein the virtual machine manager is configured to initiate the guest virtual machine in response to selecting the guest virtual machine.

13. A non-transitory processor-readable medium storing code representing instructions to be executed by a processor, the code comprising code to cause the processor to:

receive, at a host request handler, a request to execute a program on a host operating system;

determine, at the host request handler and in response to receiving the request, that the program does not have permission to execute on the host operating system and outside a virtual machine based on an indication of the program not being included on a list indicating which programs are allowed to operate on the host operating system and outside a virtual machine;

send, from the host request handler, the request to a guest request handler implemented in a guest virtual machine;

send, from the guest request handler, a signal to a guest operating system within the guest virtual machine to initiate execution of the program on the guest virtual machine if a guest program permissions list indicates that the program has permission to execute on the guest virtual machine; and send, from the guest request handler, a signal to the guest operating system to deny execution of the program on the guest virtual machine if the guest program permissions list indicates that the program does not have permission to execute on the guest virtual machine.

14. The non-transitory processor-readable medium of claim 13, further comprising code to cause the processor to:

select, using a virtual machine manager, the guest virtual machine for the program based on a program type associated with the program prior to the host request handler sending the request to the guest request handler.

15. The non-transitory processor-readable medium of claim 13, wherein the program is a first program, the code further comprising code to cause the processor to:

send, from the host request handler, a request to execute a second program to the guest request handler, the guest request handler configured to send a signal to the guest operating system to initiate execution of the second program such that the guest virtual machine executes both the second program and the first program during a time period.

16. The non-transitory processor-readable medium of claim 13, wherein the program is a first program, the code further comprising code to cause the processor to:

receive, at the host request handler, a request to execute a second program on the host operating system; and
determine, at the host request handler and in response to the request to execute the second program, that the second program has permission to execute on the host operating system and outside a virtual machine.

17. The non-transitory processor-readable medium of claim 13, wherein a virtual machine monitor is configured to host the guest virtual machine.

18. The apparatus of claim 1, wherein the indication of the program is at least one of an identifier of the program or an identifier of the program type associated with the program.

19. The apparatus of claim 7, wherein the indication of the program is at least one of an identifier of the program or an identifier of a program type associated with the program.

20. The non-transitory processor-readable medium of claim 13, wherein the indication of the program is at least one of an identifier of the program or an identifier of a program type associated with the program.

* * * * *